(12) United States Patent
Chayun et al.

(10) Patent No.: US 9,378,606 B2
(45) Date of Patent: *Jun. 28, 2016

(54) RECEIVING MALFUNCTIONING MOBILE PHONE AND A DISPENSING FUNCTIONING CELLULAR TELEPHONE CONSOLE

(71) Applicant: CELLOMAT ISRAEL LTD., Netanya (IL)

(72) Inventors: Itzik Chayun, Kfar Saba (IL); Meir Rabinovitch, Hadar Am (IL); Hanan Samet, Harad Am (IL); Rafael Poran, Kochav Yair (IL); Roshel Borachov, Neve Tamin (IL); Ron Nabarro, Raanana (IL); Rafi Bhrami, Givatayim (IL)

(73) Assignee: CELLOMAT ISRAEL LTD., Netanya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,108

(22) PCT Filed: Dec. 19, 2012

(86) PCT No.: PCT/IL2012/000392
§ 371 (c)(1),
(2) Date: Jun. 19, 2014

(87) PCT Pub. No.: WO2013/093902
PCT Pub. Date: Jun. 27, 2013

(65) Prior Publication Data
US 2014/0346185 A1    Nov. 27, 2014

Related U.S. Application Data

(63) Continuation-in-part of application No. 13/629,245, filed on Sep. 27, 2012, now Pat. No. 8,755,783.

(60) Provisional application No. 61/577,112, filed on Dec. 19, 2011.

(51) Int. Cl.
*H04W 24/00* (2009.01)
*G07F 7/06* (2006.01)
(Continued)

(52) U.S. Cl.
CPC ............... *G07F 7/06* (2013.01); *G07F 11/002* (2013.01); *G07F 17/40* (2013.01); *H04W 24/04* (2013.01)

(58) Field of Classification Search
None
See application file for complete search history.

(56) References Cited

U.S. PATENT DOCUMENTS

| 4,951,308 A | 8/1990 | Bishop et al. |
| 7,392,046 B2 | 6/2008 | Leib et al. |

(Continued)

FOREIGN PATENT DOCUMENTS

| WO | 01/15096 | 3/2001 |
| WO | 2013/093902 A1 | 6/2013 |

OTHER PUBLICATIONS

An Office Action dated Sep. 5, 2013, which issued during the prosecution of U.S. Appl. No. 13/629,245.

(Continued)

*Primary Examiner* — Diane Mizrahi
(74) *Attorney, Agent, or Firm* — Sughrue Mion, PLLC

(57) ABSTRACT

The present invention relates to a user-friendly and a user-interactive cellular mobile phone console, allowing a user to interactively replace a malfunctioning cellular mobile phone with a functioning mobile phone.

20 Claims, 30 Drawing Sheets

(51) Int. Cl.
  *G07F 17/40* (2006.01)
  *G07F 11/00* (2006.01)
  *H04W 24/04* (2009.01)

(56) References Cited

U.S. PATENT DOCUMENTS

| | | |
|---|---|---|
| 7,640,458 B2 | 12/2009 | Rao et al. |
| 7,881,965 B2* | 2/2011 | Bowles et al. ............. 705/14.37 |
| 8,755,783 B2* | 6/2014 | Brahami et al. ............. 455/418 |
| 2003/0073411 A1 | 4/2003 | Meade |
| 2003/0073412 A1 | 4/2003 | Meade |
| 2003/0073432 A1 | 4/2003 | Meade |
| 2005/0031206 A1* | 2/2005 | Kaneko et al. ................. 382/190 |
| 2008/0032789 A1* | 2/2008 | Walker et al. .................... 463/30 |
| 2008/0126261 A1* | 5/2008 | Lovett .............................. 705/72 |
| 2009/0143103 A1 | 6/2009 | Chishti et al. |
| 2010/0228676 A1 | 9/2010 | Librizzi et al. |
| 2010/0235249 A1 | 9/2010 | Smith et al. |
| 2011/0047033 A1 | 2/2011 | Mahaffey et al. |
| 2012/0021820 A1* | 1/2012 | Gordon et al. ................. 463/25 |
| 2013/0016173 A1* | 1/2013 | Johnson et al. ............ 348/14.03 |
| 2013/0090996 A1* | 4/2013 | Stark ............................ 705/14.4 |
| 2013/0124426 A1 | 5/2013 | Bowles et al. |
| 2013/0157641 A1 | 6/2013 | Brahami et al. |
| 2013/0246285 A1 | 9/2013 | Chayun et al. |
| 2013/0311318 A1 | 11/2013 | Librizzi et al. |
| 2014/0249668 A1 | 9/2014 | Brahami et al. |
| 2014/0295819 A1 | 10/2014 | Chayon et al. |
| 2014/0346185 A1 | 11/2014 | Chayun et al. |

OTHER PUBLICATIONS

Notice of Allowance dated Feb. 4, 2014, which issued during the prosecution of U.S. Appl. No. 13/629,245.
An International Search Report and a Written Opinion both dated May 28, 2013, which issued during the prosecution of Applicant's PCT/IL2012/000392.
An International Preliminary Report on Patentability dated Jun. 24, 2014, which issued during the prosecution of Applicant's PCT/IL2012/000392.
An Office Action dated Aug. 12, 2015, which issued during the prosecution of U.S. Appl. No. 14/305,328.
European Search Report dated Aug. 14, 2015, which issued during the prosecution of Applicant's European App No. 12858899.3.
An Office Action dated May 28, 2015, which issued during the prosecution of U.S. Appl. No. 14/277,908.

* cited by examiner

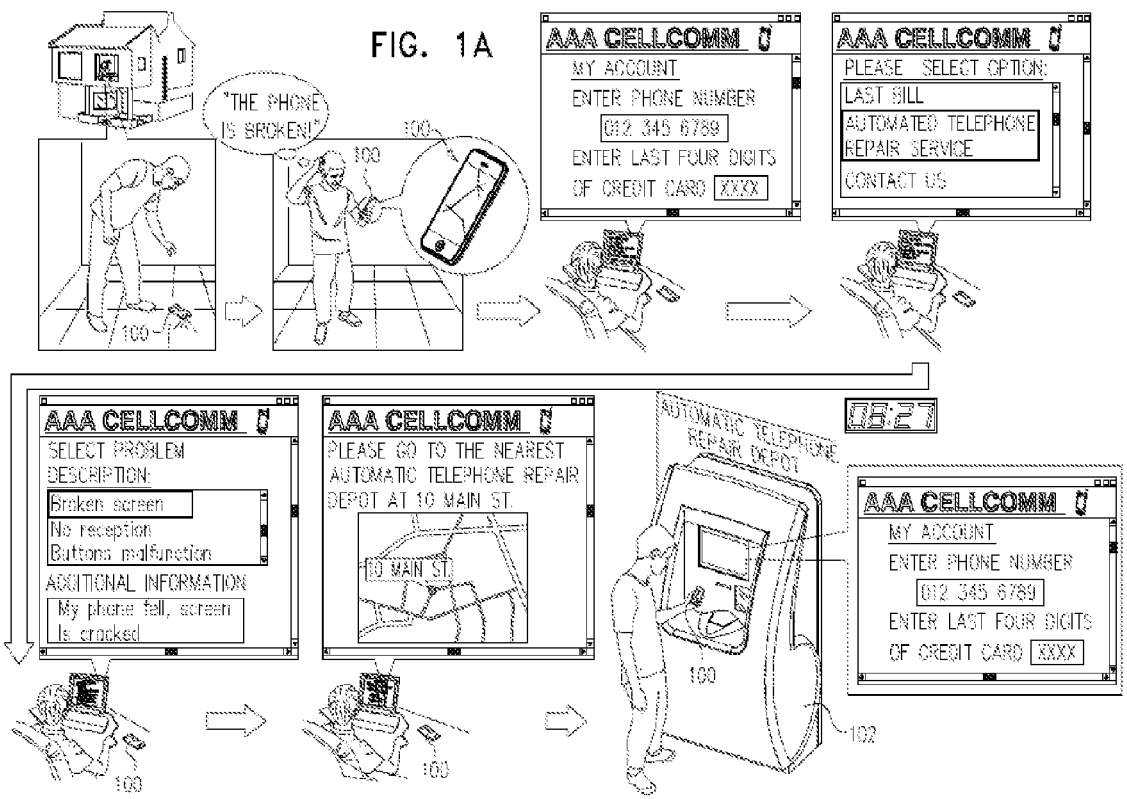

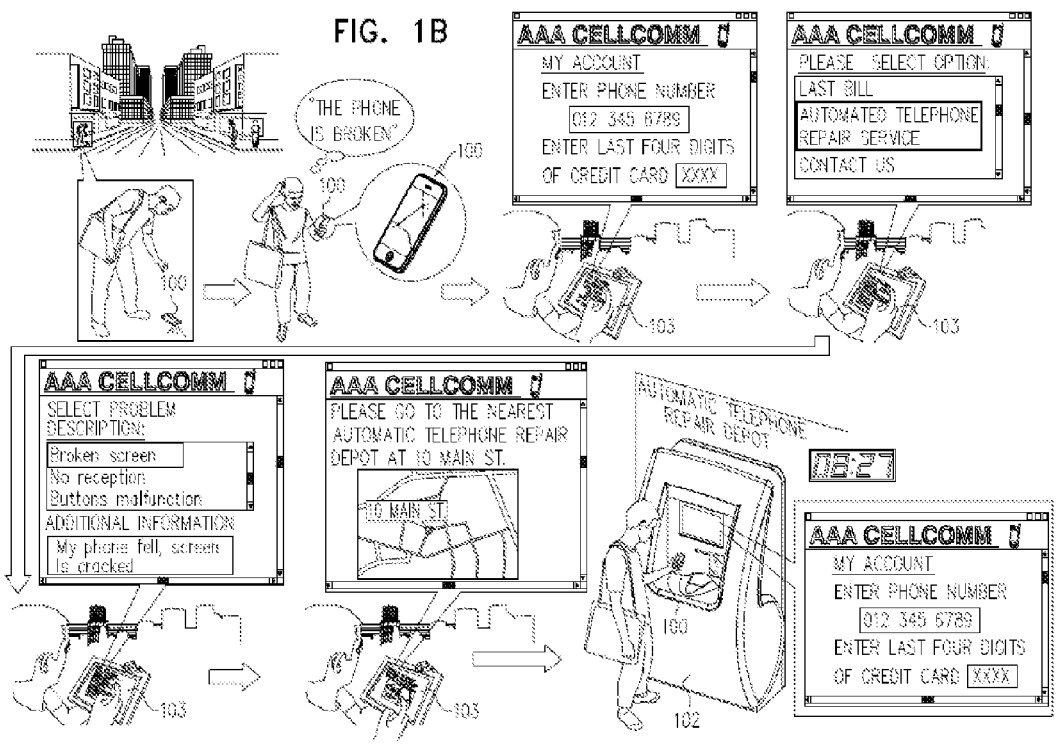

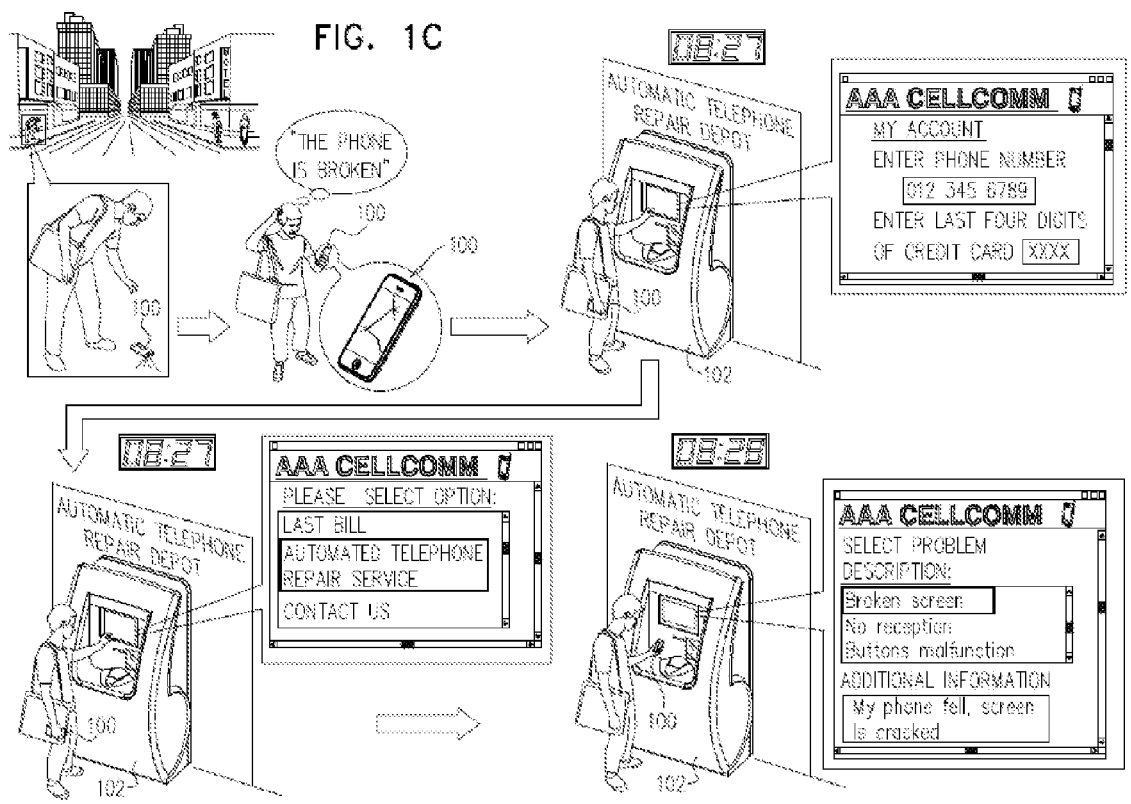

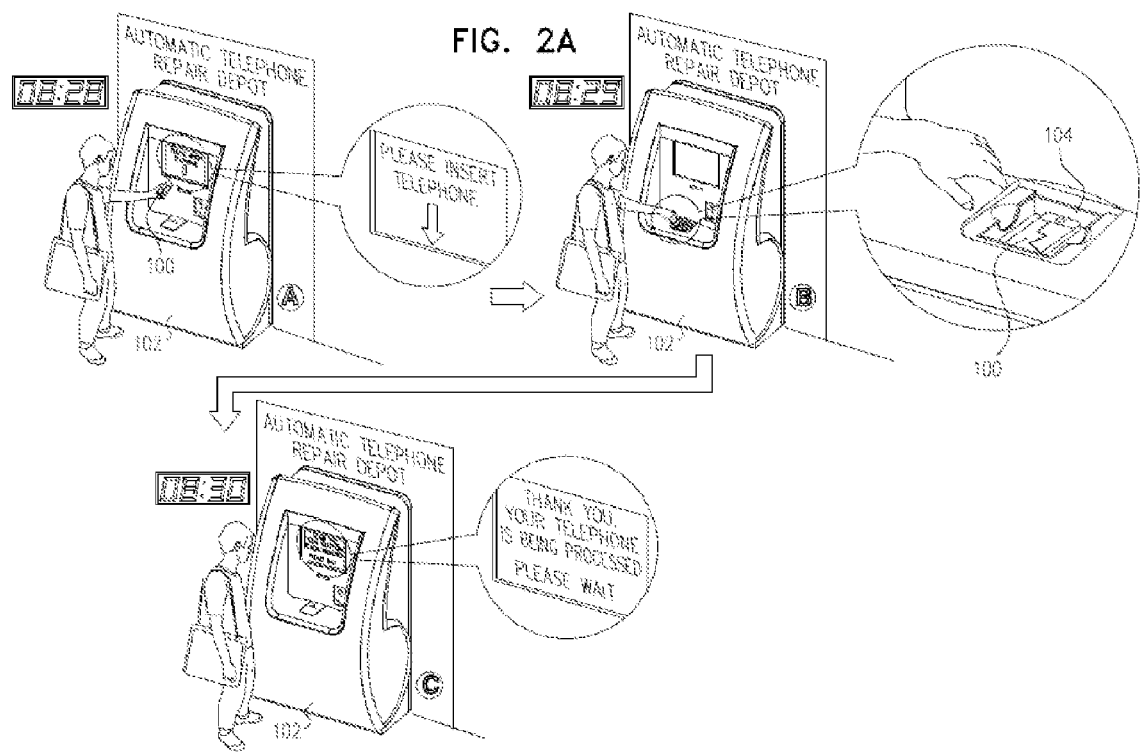

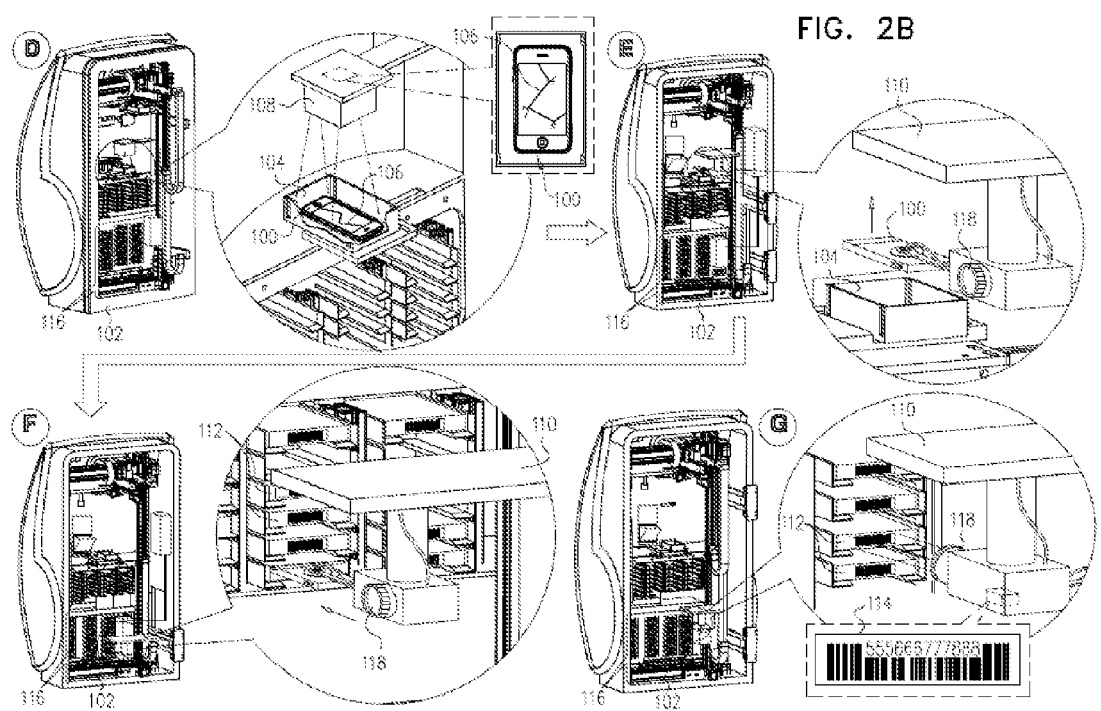

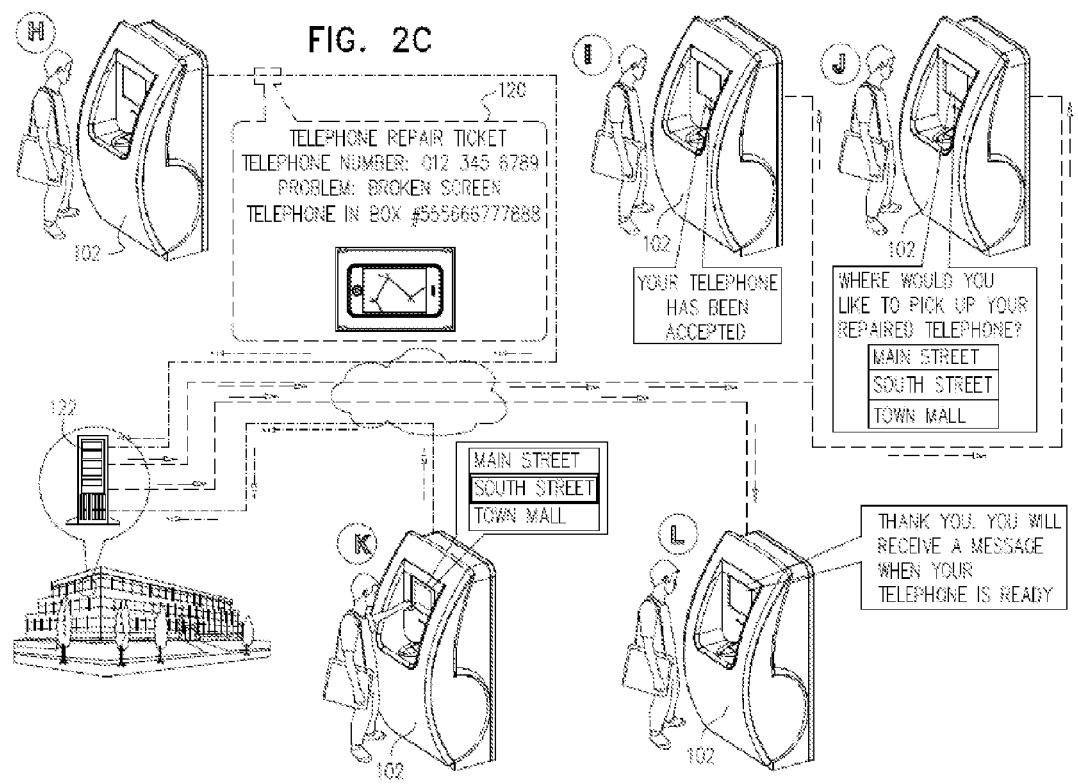

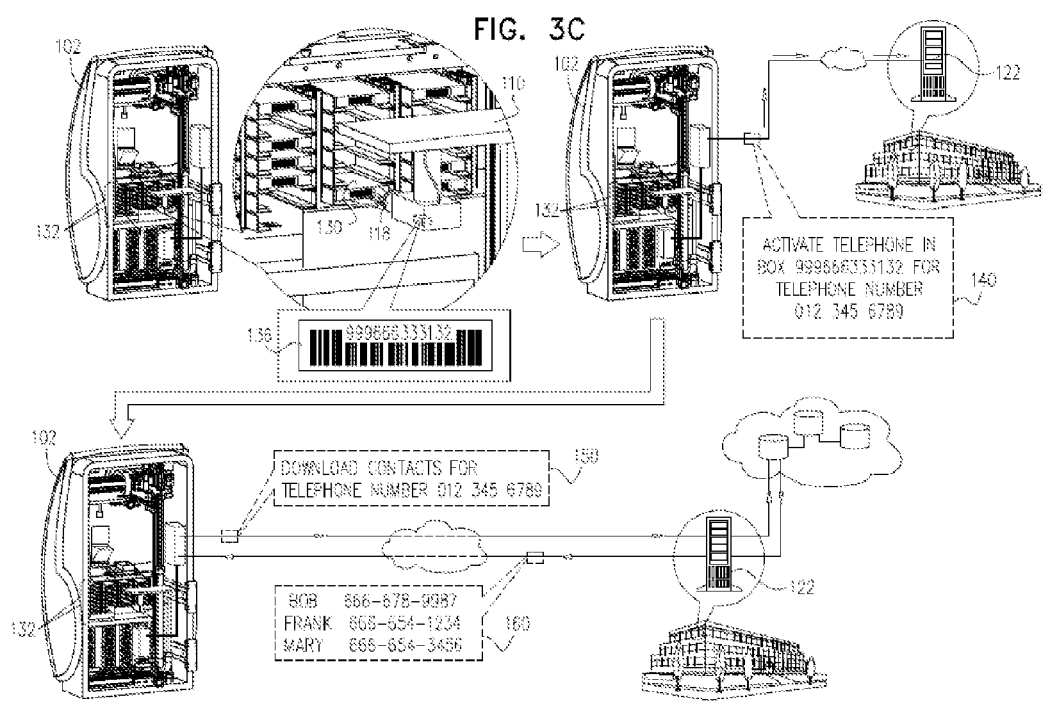

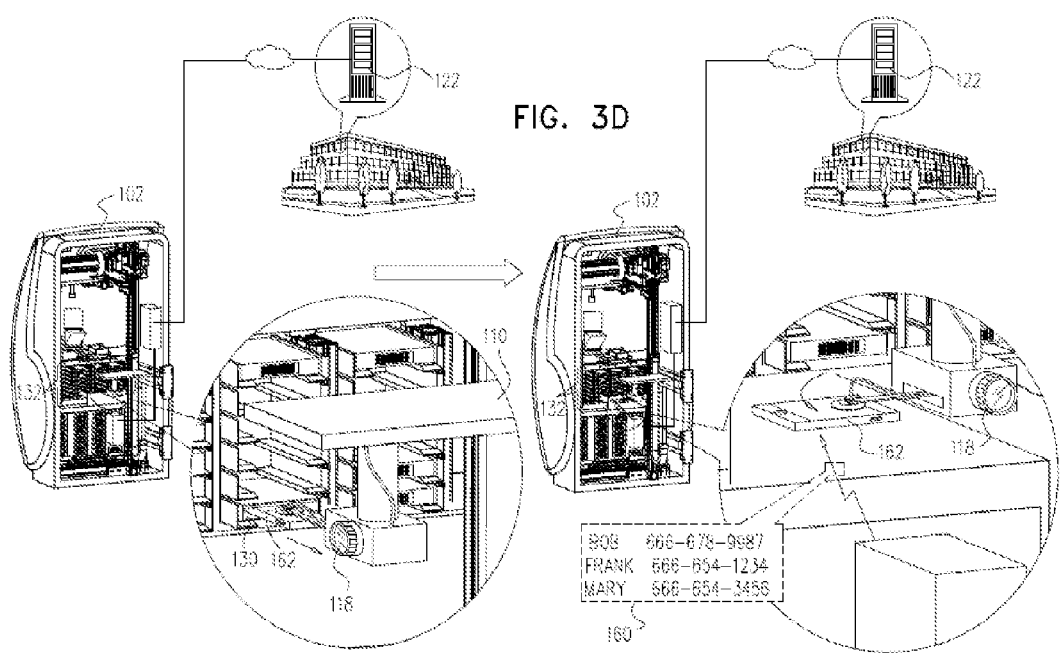

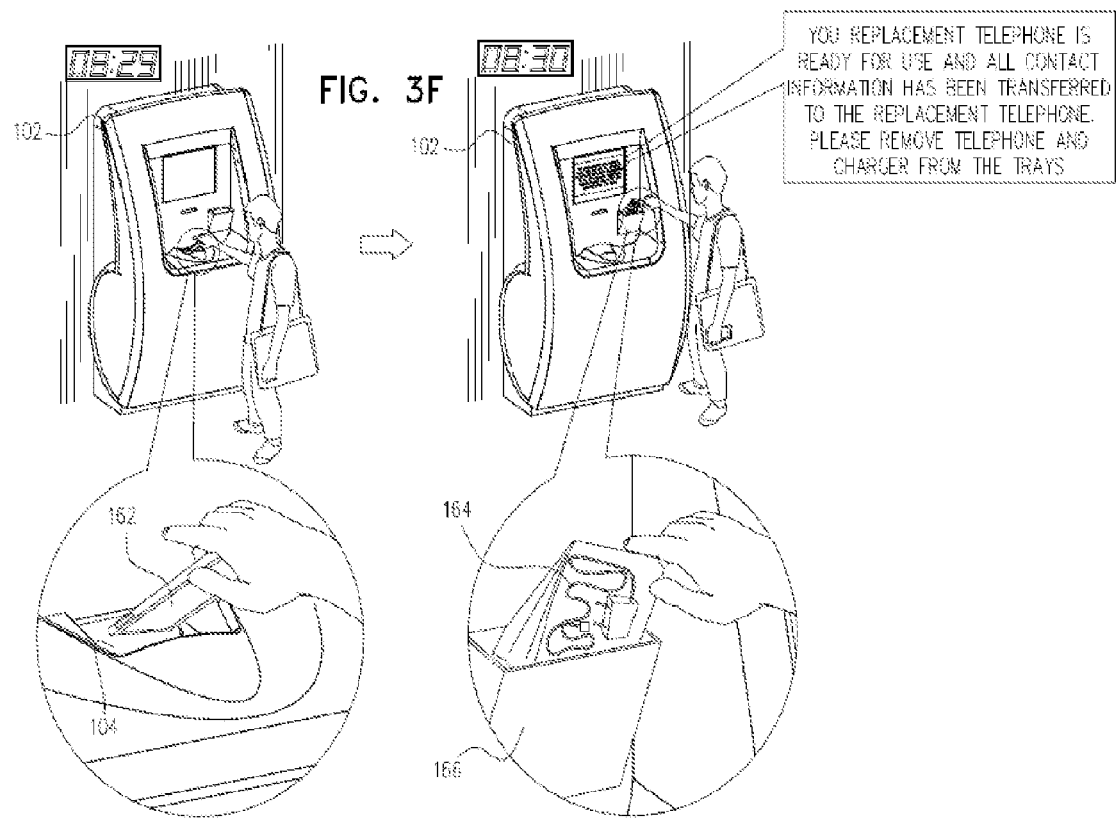

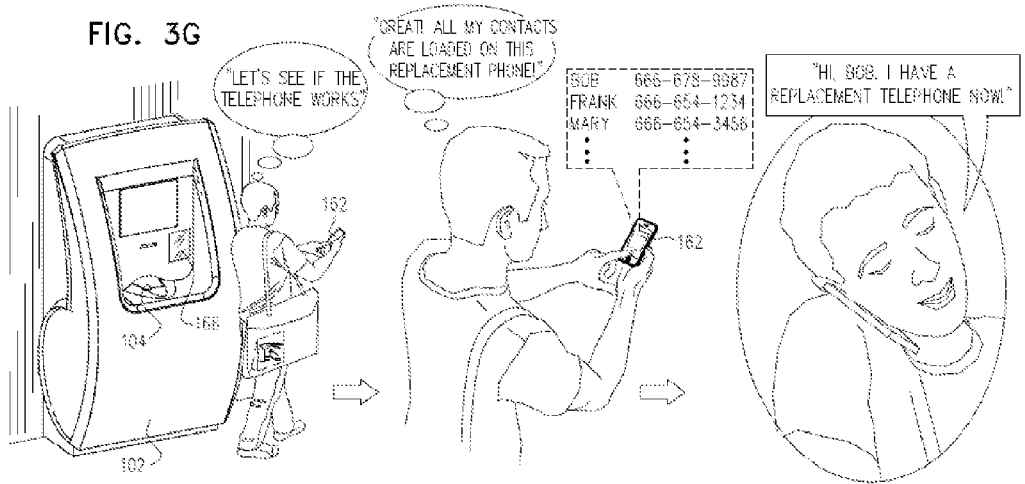

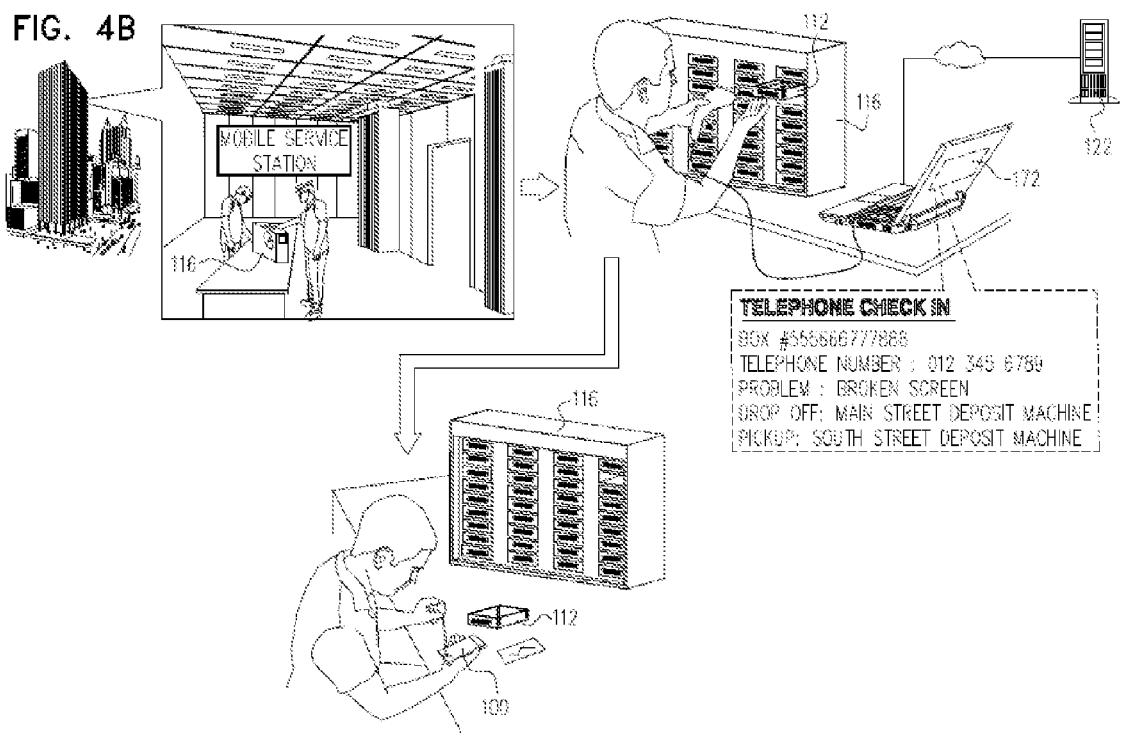

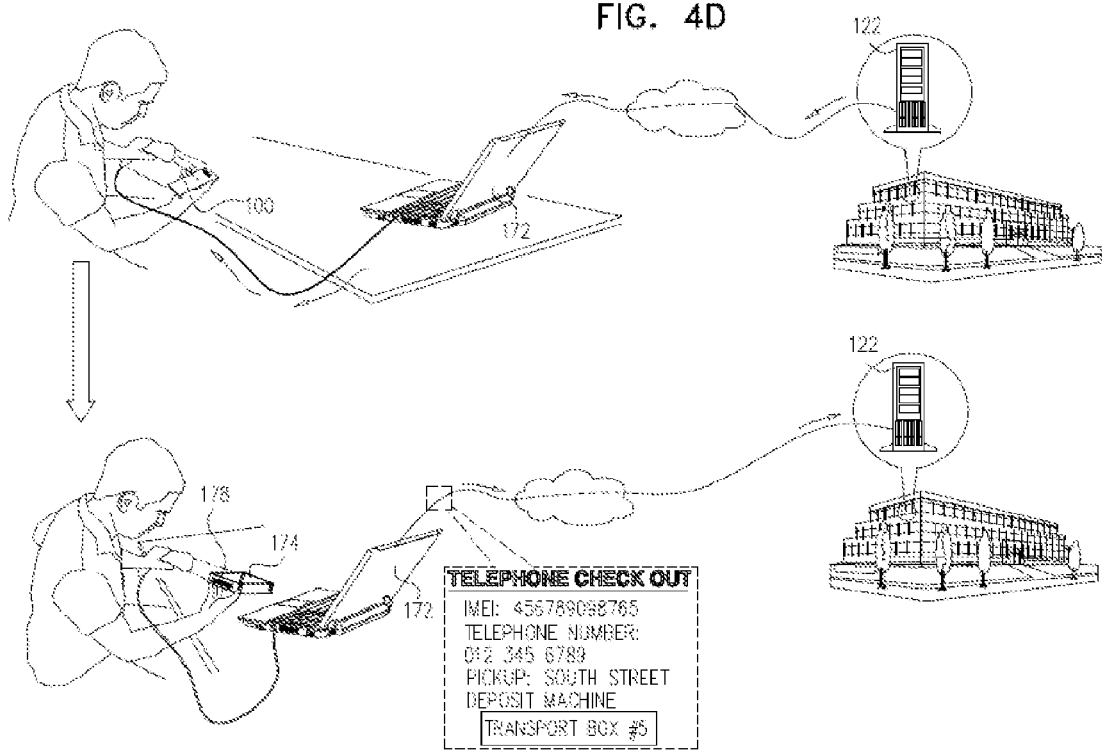

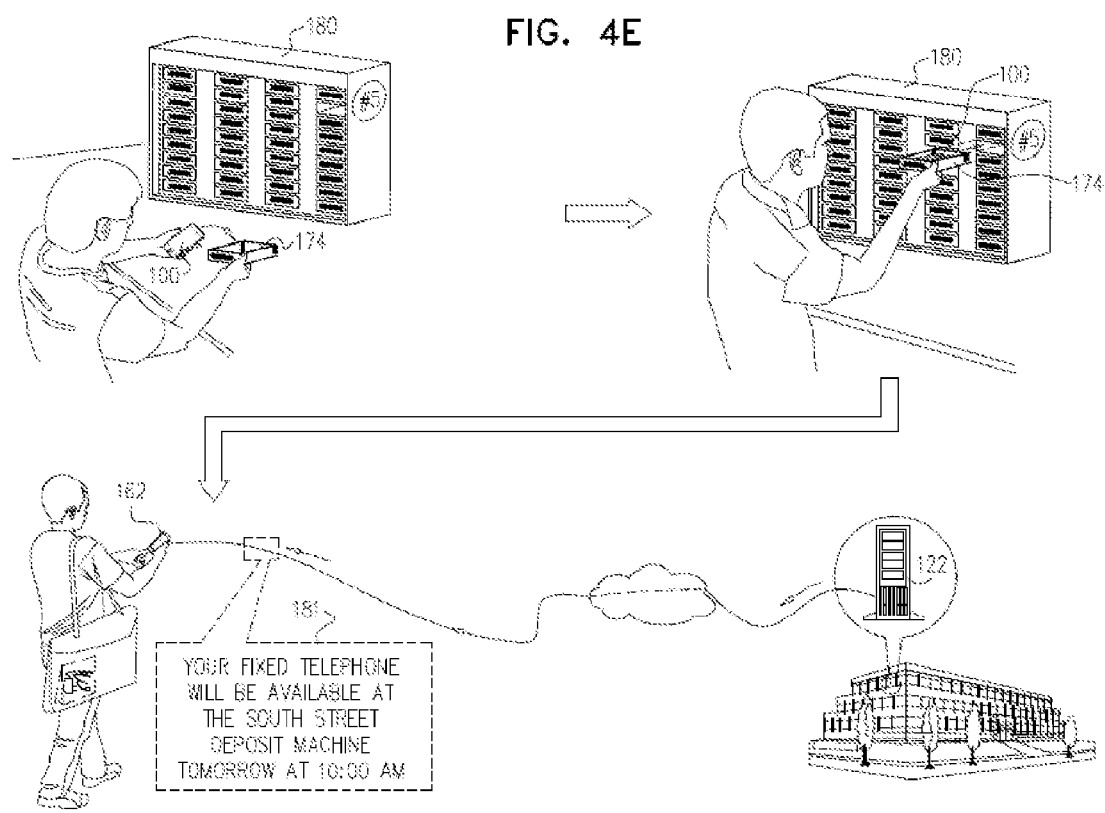

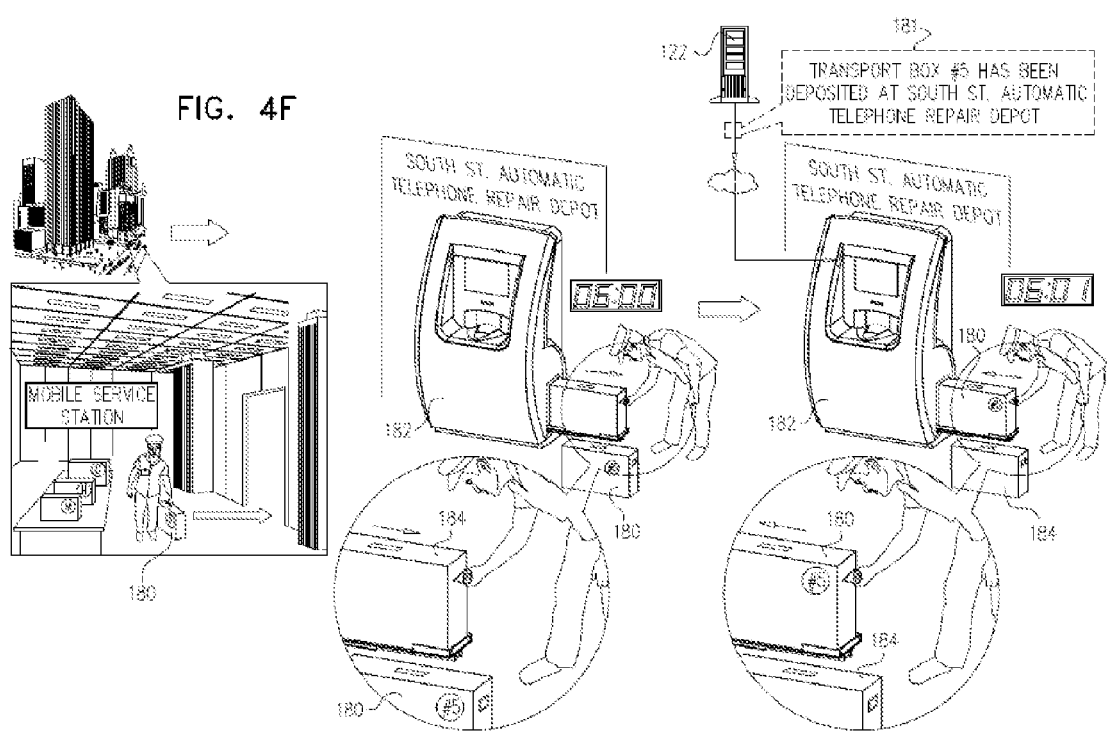

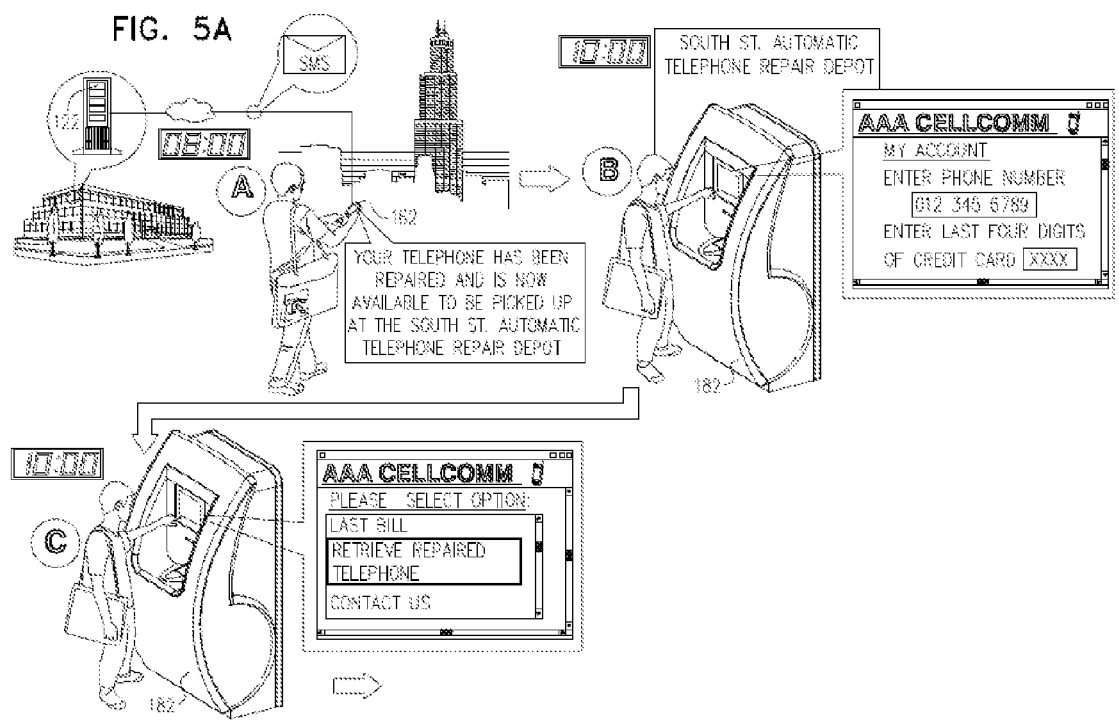

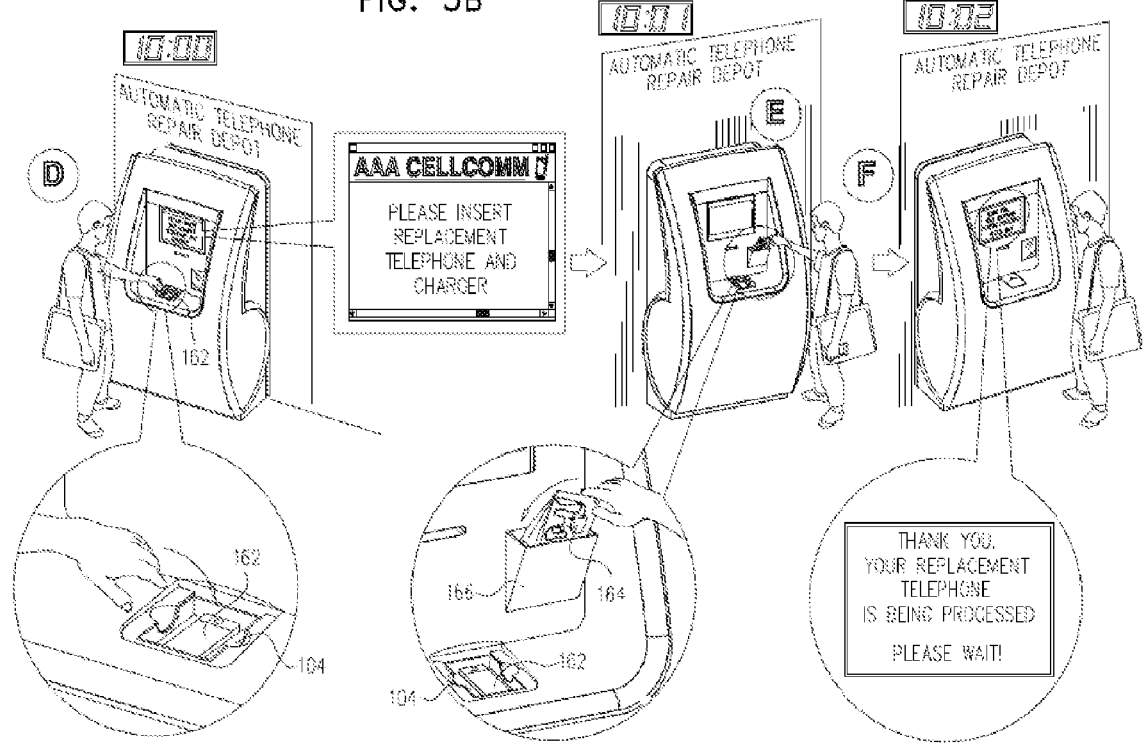

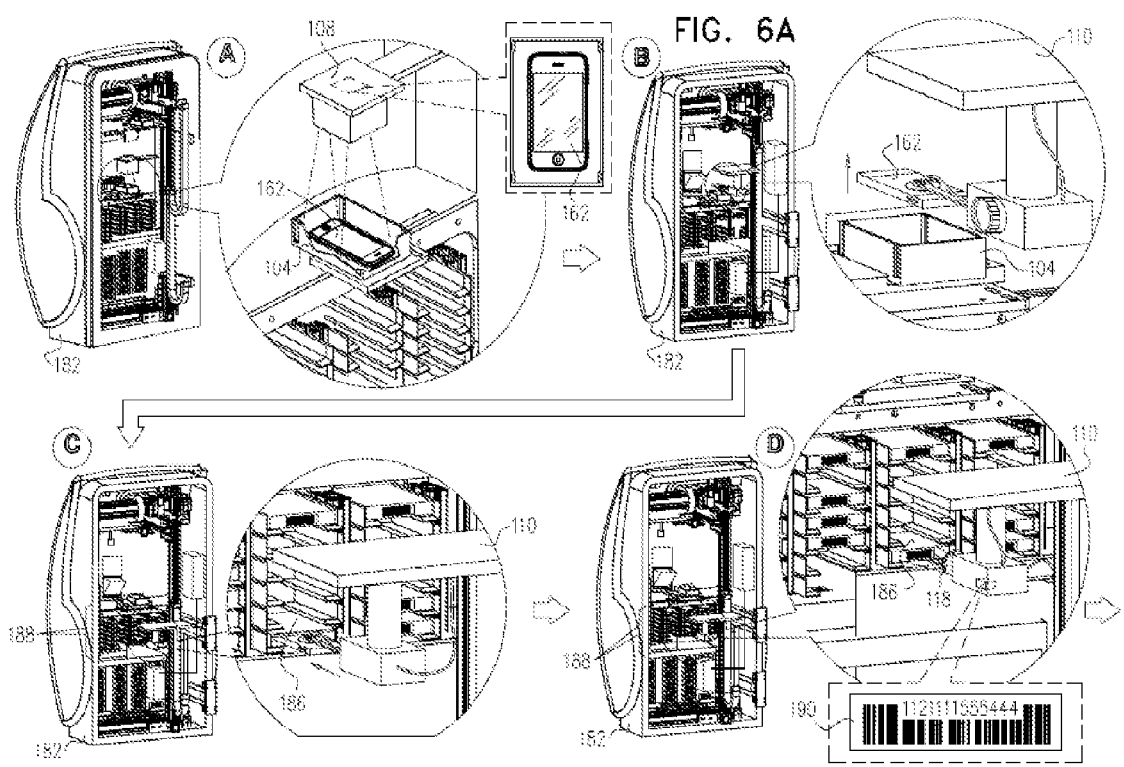

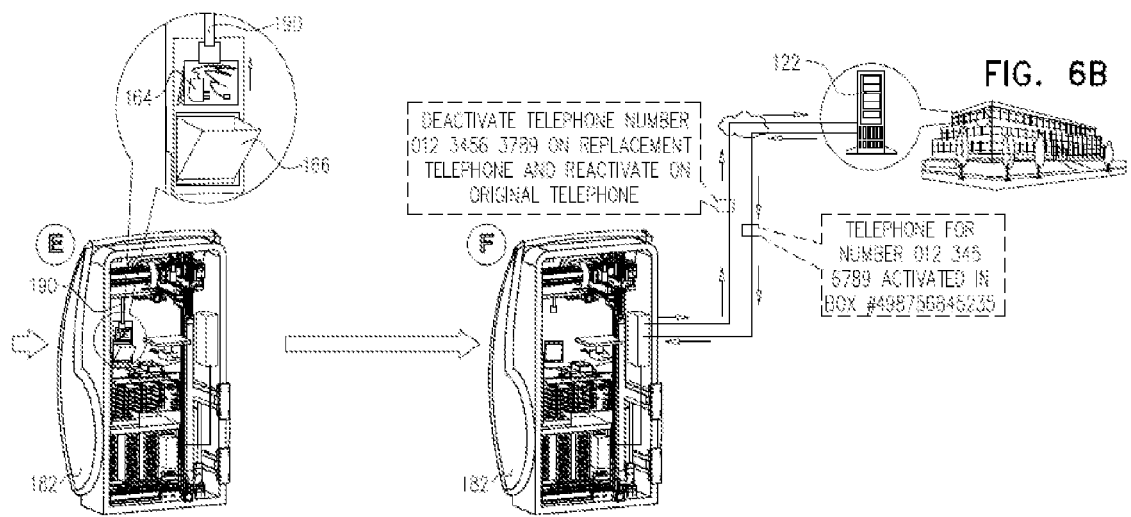

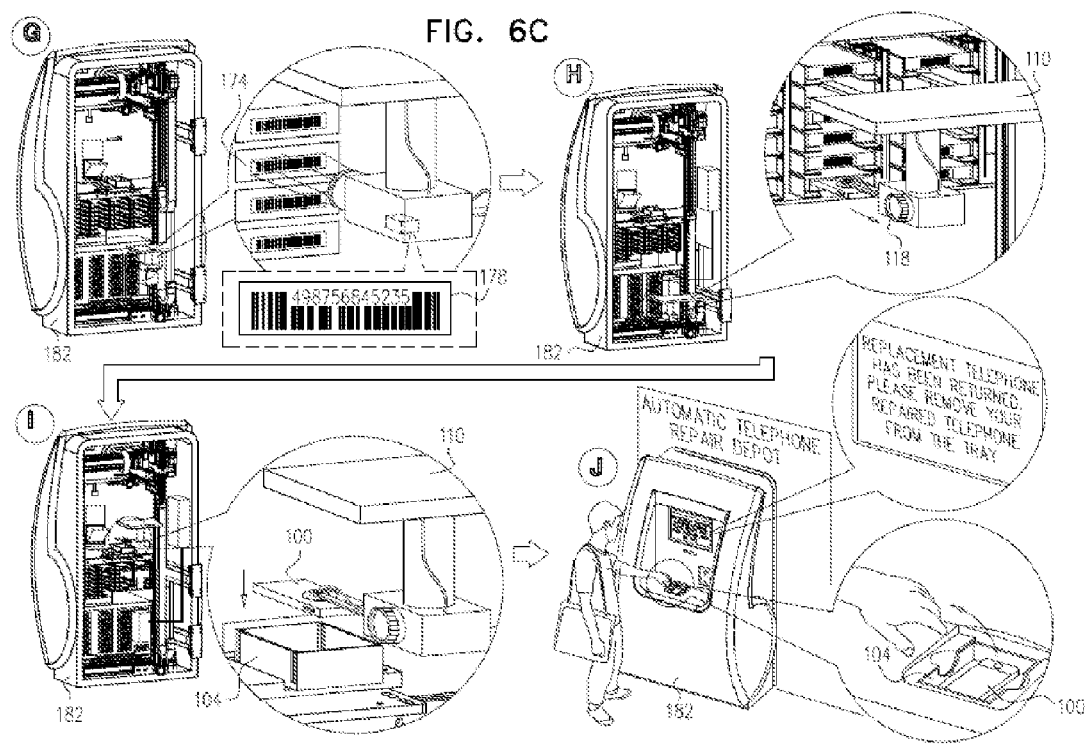

US 9,378,606 B2

RECEIVING MALFUNCTIONING MOBILE PHONE AND A DISPENSING FUNCTIONING CELLULAR TELEPHONE CONSOLE

REFERENCE TO RELATED APPLICATIONS

This application is a National Phase Application of PCT/IL2012/000392, filed Dec. 19, 2012, entitled A RECEIVING MALFUNCTIONING MOBILE PHONE AND A DISPENSING FUNCTIONING CELLULAR TELEPHONE CONSOLE and is a continuation-in-part of U.S. patent application Ser. No. 13/629,245, filed Sep. 27, 2012, entitled "AUTOMATIC MOBILE COMMUNICATOR DEPOT SYSTEM AND METHODOLOGY," which claims priority of U.S. Provisional Patent Application Ser. No. 61/577,112, entitled A RECEIVING MALFUNCTIONING MOBILE PHONE AND A DISPENSING FUNCTIONING CELLULAR TELEPHONE CONSOLE, filed Dec. 19, 2011, the disclosures of which are hereby incorporated by reference.

FIELD OF THE INVENTION

This invention relates to a cellular mobile phone console for receiving, from a defined user, a malfunctioning cellular phone; and a dispensing said user with a functioning cellular telephone. It should be emphasized that the dispensed functioning cellular telephone is not necessarily the received malfunctioned cellular phone; furthermore, it should be emphasized that the dispensed functioning cellular telephone could be from a different model/type than the received malfunctioned cellular phone.

The core concept behind the present invention is the ability to receive, from a defined user, a malfunctioning cellular phone; and to dispense said user with a functioning cellular telephone.

BACKGROUND OF THE INVENTION

In recent years, the number of mobile communicators in the hands of the public has increased greatly, thus creating a need for efficient logistics for handling and replacement thereof.

SUMMARY OF THE INVENTION

The present invention seeks to provide a user-friendly and a user-interactive cellular mobile phone replacement console, allowing a user to insert a malfunctioning mobile phone into the mobile phone console and receiving a replacement mobile phone from the cellular phone console It is one object of the present invention to provide a cellular phone console comprising: a receiving port for receiving, from a defined user, a malfunctioning cellular phone; and a dispensing mechanism for providing said user with a functioning cellular telephone.

It is another object of the present invention to provide the cellular phone console as defined above, wherein the type of said functioning cellular telephone is different than the type of said malfunctioning cellular phone.

It is another object of the present invention to provide the cellular phone console as defined above, wherein said user interactive unit comprises a user data input device for providing data input to said console said input data comprises at least one of the following: a user identification code; cellular mobile phone manufacturer data; a cellular mobile phone serial number; a cellular mobile phone model type and any combination thereof.

It is another object of the present invention to provide the cellular phone console as defined above, wherein said at least one cellular phone malfunction is selected from the group consisting of at least one hardware malfunction, at least one software malfunction and any combination thereof.

It is another object of the present invention to provide the cellular phone console as defined above, further comprising an outlet port for ejecting a replacement cellular mobile phone.

It is another object of the present invention to provide the cellular phone console as defined above, further comprising a selection of temporary replacement cellular mobile phones.

It is another object of the present invention to provide the cellular phone console as defined above, further comprising an ejection port for providing said user with said selected temporary replacement cellular mobile phone.

It is another object of the present invention to provide a method for replacing a cellular mobile phone comprising:
  providing a cellular phone console, in a cellular phone station:
  inserting a malfunctioning cellular mobile phone into a receiving port of said station; and,
  dispensing a functioning cellular telephone.

It is another object of the present invention to provide the method as defined above, additionally comprising step of inputting a user identification code into said console by means of a data input device.

It is another object of the present invention to provide the method as defined above, additionally comprising step of confirming that said user is a registered user.

It is another object of the present invention to provide the cellular phone console as defined above, wherein said cellular phone console is placed in public domains.

It is another object of the present invention to provide the cellular phone console as defined above, wherein said cellular phone console is provided with at least one anti-theft mechanism adapted to prevent any burglary and theft of said malfunctioned cellular phones received.

It is another object of the present invention to provide the cellular phone console as defined above, wherein said cellular phone console is provided with at least one identification mechanism adapted to identify said user.

It is another object of the present invention to provide the cellular phone console as defined above, wherein said cellular phone console is provided with at least one identification mechanism adapted to identify said malfunctioned cellular phones received.

It is another object of the present invention to provide the cellular phone console as defined above, wherein said identification mechanism is adapted to identify at least one selected from a group consisting of the model of said malfunctioned cellular phones received, the producer of said malfunctioned cellular phones received, the phone number of said user, the I.D. number of said user, the address of said user, the email of said user and any combination thereof.

It is another object of the present invention to provide the cellular phone console as defined above, wherein said malfunctioned cellular phones received is enclosed within a protected container.

It is another object of the present invention to provide the cellular phone console as defined above, wherein said cellular phone console is provided with means adapted to enable the back-up of information contained within said malfunctioned cellular phones received.

It is another object of the present invention to provide the cellular phone console as defined above, wherein said cellular phone console is provided with means adapted to diagnose said malfunctioned phone.

It is another object of the present invention to provide the cellular phone console as defined above, wherein any accessories of said malfunctioned phone's are adapted to be tagged with radio frequency identification (RFID).

It is another object of the present invention to provide the cellular phone console as defined above, wherein said accessories are selected from a group consisting of bag, battery, charger and any combination thereof.

It is another object of the present invention to provide the cellular phone console as defined above, wherein said cellular phone console is provided with at least one camera adapted to identify said user.

It is another object of the present invention to provide the cellular phone console as defined above, wherein said cellular phone console is adapted to dispense at least one receipt once said malfunctioning cellular phone is received within said cellular phone station.

It is another object of the present invention to provide the cellular phone console as defined above, wherein said at least one receipt comprising at least one detail selected from a group consisting of details of said malfunctioned phone, detail on said user, the malfunction itself, details on the cellular phone console in which the malfunctioned phone had been deposit, detail on the date and time at which the malfunctioned phone has been deposited in said cellular phone console, and an identification number in case said malfunctioned phone is lost; and any combination thereof.

It is another object of the present invention to provide the cellular phone console as defined above, wherein said details of said malfunctioned phone is selected from a group consisting of type of said malfunctioned phone, phone number of said malfunctioned phone and any combination thereof.

It is another object of the present invention to provide the cellular phone console as defined above, wherein said detail on said user is selected from a group consisting of name of said user, ID of said user, address of said user, reachable number of said user and any combination thereof. It is another object of the present invention to provide the method as defined above, additionally comprising step of dispensing at least one receipt once said malfunctioning cellular phone is received within said cellular phone station.

It is another object of the present invention to provide the method as defined above, wherein said at least one receipt comprising at least one detail selected from a group consisting of details of said malfunctioned phone, detail on said user, the malfunction itself, details on the cellular phone console in which the malfunctioned phone had been deposit, and an identification number in case said malfunctioned phone is lost, detail on the date and time at which the malfunctioned phone has been deposited in said cellular phone console, and any combination thereof.

It is another object of the present invention to provide the method as defined above, wherein said details of said malfunctioned phone is selected from a group consisting of type of said malfunctioned phone, phone number of said malfunctioned phone and any combination thereof.

It is another object of the present invention to provide the method as defined above, wherein said detail on said user is selected from a group consisting of name of said user, ID number of said user, address of said user, reachable number of said user and any combination thereof.

It is another object of the present invention to provide the method as defined above, wherein said details of said malfunctioned phone is selected from a group consisting of type of said malfunctioned phone, phone number of said malfunctioned phone and any combination thereof.

It is another object of the present invention to provide the method as defined above, wherein said detail on said user is selected from a group consisting of name of said user, ID of said user, address of said user, reachable number of said user and any combination thereof.

The present invention also seeks to provide an automatic mobile communicator depot system and methodology. There is thus provided in accordance with a preferred embodiment of the present invention an automatic mobile communicator depot system including a mobile communicator acceptor for accepting mobile communicators and providing mobile communicator acceptance inputs, a mobile communicator dispenser for dispensing substitute mobile communicators in response to substitute mobile communicator dispensing instructions, a customer interface receiving customer inputs identifying a specific mobile communicator with a specific customer, and a depot controller responsive at least to the customer inputs and the acceptance inputs and including dispenser control functionality for providing dispensing instructions to the mobile communicator dispenser to dispense a specific substitute mobile communicator to a specific customer and automatic telephone number transfer functionality for transferring a telephone number from a mobile communicator received by the mobile communicator acceptor from a given customer to the substitute mobile communicator dispensed by the mobile communicator dispenser to the customer.

Preferably, the mobile communicator acceptor is operative to accept from a customer a mobile communicator to be repaired and the mobile communicator dispenser is operative to dispense to the customer a temporary replacement mobile communicator to be used until the customer's mobile communicator is returned in a repaired state to the customer. Additionally or alternatively, the mobile communicator acceptor is operative to accept from a customer a mobile communicator to be replaced and the mobile communicator dispenser is operative to dispense to the customer a permanent replacement mobile communicator.

Preferably, the mobile communicator acceptor is also operative to accept from the customer the temporary replacement mobile communicator and the mobile communicator dispenser is operative to dispense the mobile communicator earlier received by the mobile communicator acceptor from the customer, to the customer in a repaired state. Additionally or alternatively, the mobile communicator acceptor is operative to accept from the customer a temporary replacement mobile communicator dispensed to the customer by a mobile communicator dispenser which is not the a mobile communicator dispenser, and the mobile communicator dispenser is operative to dispense the mobile communicator earlier received from the customer by a mobile communicator acceptor which is not the mobile communicator acceptor, to the customer in a repaired state.

Preferably, the automatic telephone number transfer functionality is operative for transferring the telephone number from the temporary replacement mobile communicator received by the mobile communicator acceptor from the customer to the mobile communicator dispensed to the customer in a repaired state.

Preferably, the depot controller also includes automatic data transfer functionality operable for transferring of data stored in a mobile communicator received by the mobile communicator acceptor from a given customer to the temporary substitute mobile communicator dispensed by the mobile communicator dispenser to the customer. Preferably, the data includes at least part of a contact list. Preferably, the transferring of data is at least partly wireless. Preferably, the automatic data transfer functionality is also operable for transferring of data stored in the temporary substitute mobile communicator earlier received by the mobile communicator acceptor from a given customer to the mobile communicator dispensed to the customer in a repaired state.

Additionally or alternatively, the depot controller also includes automatic data transfer functionality operable for transferring of data of a given customer, the data stored in an internet accessible storage facility, to the temporary substitute mobile communicator dispensed by the mobile communicator dispenser to the customer. Preferably, the data includes at least part of a contact list. Preferably, the transferring of data is at least partly wireless.

Preferably, the depot system also includes a customer internet interface operable for receiving customer inputs identifying a specific mobile communicator with a specific customer via the internet. Preferably, the customer inputs include at least a telephone number of the specific mobile communicator. Preferably, the customer inputs include at least a description of a malfunction of the specific mobile communicator which needs to be repaired and a preferred future pickup location of the specific mobile communicator in a repaired state.

Preferably, the mobile communicator acceptor also includes imaging functionality for capturing an image of at least part of the specific mobile communicator.

Preferably, the mobile communicator acceptor also includes depot-service center communication functionality operative for communicating between the depot and at least one mobile communicator service center. Preferably, the depot-service center communication functionality is operable for communicating at least some of the customer inputs to the at least one mobile communicator service center.

Preferably, the mobile communicator acceptor is also operative to place the specific mobile communicator into a bin located within a mobile communicator storage and transport structure.

Preferably, the depot-service center communication functionality is operable for communicating the identities of the bin and of the mobile communicator storage and transport structure to the at least one mobile communicator service center in association with a unique identifier of the specific mobile communicator.

Preferably, at least part of the identities of the bin and of the mobile communicator storage and transport structure are encoded in barcodes imprinted on respective ones of the bin and the mobile communicator storage and transport structure. Preferably, the depot system also includes barcode scanning functionality operable for reading the barcodes.

Preferably, the automatic telephone number transfer functionality is operative to employ the depot-service center communication functionality to employ the at least one mobile communicator service center for the transferring a telephone number.

Preferably, the mobile communicator dispenser is also operable for dispensing, to the customer, mobile communicator accessories suitable for use with the substitute mobile communicators to be used until the customer's mobile communicator is returned in a repaired state to the customer, and the mobile communicator acceptor is also operable for accepting, from the customer, the mobile communicator accessories earlier dispensed to the customer, upon return of the customer's mobile communicator in a repaired state to the customer. Preferably, the accessories include at least one of a mobile communicator charger and a data synchronizing cable.

Preferably, the mobile communicator storage and transport structure is operable for removal thereof from the depot and for transport between the depot and the mobile communicator service center.

Preferably, the depot also includes customer messaging functionality operative to notify the customer that his mobile communicator has been repaired and will be available for pickup at a specific automatic mobile communicator depot at a specific time. Additionally or alternatively, the depot also includes customer messaging functionality operative to notify the customer that his mobile communicator has been repaired and is available for pickup at a specific automatic mobile communicator depot.

There is also provided in accordance with another preferred embodiment of the present invention a method for operating an automatic mobile communicator depot including accepting mobile communicators and providing mobile communicator acceptance inputs, dispensing substitute mobile communicators in response to substitute mobile communicator dispensing instructions, receiving customer inputs identifying a specific mobile communicator with a specific customer, and responsive at least to the customer inputs and the acceptance inputs, providing dispensing instructions to the mobile communicator dispenser to dispense a specific substitute mobile communicator to a specific customer, and automatically transferring a telephone number from a mobile communicator received by the mobile communicator acceptor from a given customer to the substitute mobile communicator dispensed by the mobile communicator dispenser to the customer.

Preferably, accepting mobile communicators includes accepting from a customer a mobile communicator to be repaired, and dispensing substitute mobile communicators includes dispensing to the customer a temporary replacement mobile communicator to be used until the customer's mobile communicator is returned in a repaired state to the customer. Additionally or alternatively, accepting mobile communicators includes accepting from a customer a mobile communicator to be replaced, and dispensing substitute mobile communicators includes dispensing to the customer a permanent replacement mobile communicator.

Preferably, accepting mobile communicators includes accepting from the customer the temporary replacement mobile communicator, and dispensing substitute mobile communicators includes dispensing the mobile communicator earlier received from the customer, to the customer in a repaired state.

Preferably, the transferring includes automatically transferring the telephone number from the temporary replacement mobile communicator received from the customer to the mobile communicator dispensed to the customer in a repaired state.

Preferably, the method also includes automatically transferring data stored in a mobile communicator received from a given customer to the temporary substitute mobile communicator dispensed to the customer. Preferably, the data includes at least part of a contact list. Preferably, the transferring of data is at least partly wireless. Preferably, the method also includes automatically transferring data stored in the temporary substitute mobile communicator earlier received from the given customer to the mobile communicator dispensed to the customer in a repaired state.

Additionally or alternatively, the method also includes automatically transferring data of a given customer, the data stored in an internet accessible storage facility, to the temporary substitute mobile communicator dispensed to the customer. Preferably, the data includes at least part of a contact list. Preferably, the transferring of data is at least partly wireless.

Preferably, the method also includes receiving customer inputs identifying a specific mobile communicator with a specific customer via the internet.

Preferably, the customer inputs include at least a telephone number of the specific mobile communicator. Preferably, the customer inputs include at least a description of a malfunction of the specific mobile communicator which needs to be repaired and a preferred future pickup location of the specific mobile communicator in a repaired state.

Preferably, the method also includes capturing an image of at least part of the specific mobile communicator. Preferably, the method also includes communicating between the depot and at least one mobile communicator service center. Preferably, the communicating includes communicating at least some of the customer inputs to the at least one mobile communicator service center.

Preferably, the method also includes placing the specific mobile communicator into a bin located within a mobile communicator storage and transport structure. Preferably, the communicating includes communicating the identities of the bin and of the mobile communicator storage and transport structure to the at least one mobile communicator service center in association with a unique identifier of the specific mobile communicator.

Preferably, at least part of the identities of the bin and of the mobile communicator storage and transport structure are encoded in barcodes imprinted on respective ones of the bin and the mobile communicator storage and transport structure.

Preferably, the method also includes dispensing, to the customer, mobile communicator accessories suitable for use with the substitute mobile communicators to be used until the customer's mobile communicator is returned in a repaired state to the customer, and accepting, from the customer, the mobile communicator accessories earlier dispensed to the customer, upon return of the customer's mobile communicator in a repaired state to the customer. Preferably, the accessories include at least one of a mobile communicator charger and a data synchronizing cable.

Preferably, the mobile communicator storage and transport structure is operable for removal thereof from the depot and for transport between the depot and the mobile communicator service center.

Preferably, the method also includes notifying the customer that his mobile communicator has been repaired and will be available for pickup at a specific automatic mobile communicator depot at a specific time. Additionally or alternatively, the method also includes notifying the customer that his mobile communicator has been repaired and is available for pickup at a specific automatic mobile communicator depot.

BRIEF DESCRIPTION OF THE DRAWINGS

A preferred embodiment of the current invention is described hereinbelow with reference to the following drawings:

FIGS. 1A, 1B and 1C are simplified illustrations of three examples of an initial stage of mobile communicator depot methodology in accordance with a preferred embodiment of the present invention;

FIGS. 2A, 2B and 2C together are a simplified illustration of an automatic acceptance processing of a customer's mobile communicator stage of mobile communicator depot methodology in accordance with a preferred embodiment of the present invention;

FIGS. 3A, 3B, 3C, 3D, 3E, 3F and 3G together are a simplified illustration of a replacement mobile communicator personalization and dispensing stage of mobile communicator depot methodology in accordance with a preferred embodiment of the present invention;

FIGS. 4A, 4B, 4C, 4D, 4E and 4F together are a simplified illustration of a back-end processing stage of mobile communicator depot methodology in accordance with a preferred embodiment of the present invention;

FIGS. 5A and 5B together are a simplified illustration of a replacement mobile communicator return stage of mobile communicator depot methodology in accordance with a preferred embodiment of the present invention; and FIGS. 6A, 6B, 6C and 6D together are a simplified illustration of replacement mobile communicator acceptance, validation and depersonalization functionality and customer's mobile communicator repersonalization and dispensing functionality in accordance with a preferred embodiment of the present invention.

DETAILED DESCRIPTION OF THE INVENTION

Figure 3A:
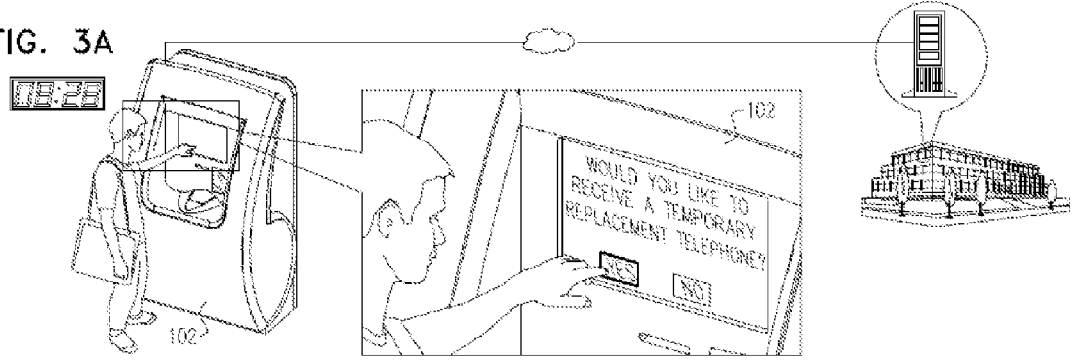
Figure 3B:
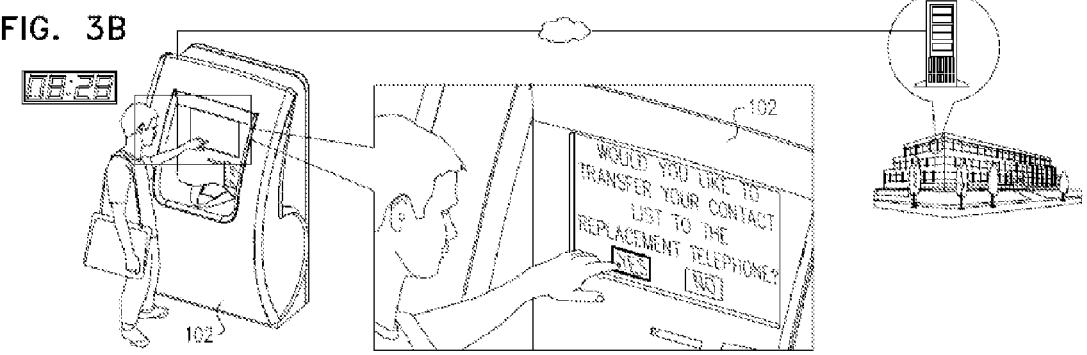

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figures and described in the specification, but only as indicated in the accompanying claims, with the proper scope determined only by the broadest interpretation of said claims.

This invention relates to a cellular mobile phone console for receiving, from a defined user, a malfunctioning cellular phone; and a dispensing said user with a functioning cellular telephone. It should be emphasized that the dispensed functioning cellular telephone is not necessarily the received malfunctioned cellular phone; furthermore, it should be emphasized that the dispensed functioning cellular telephone could be from a different model than the received malfunctioned cellular phone. The core concept behind the present invention is the ability to receive, from a defined user, a malfunctioning cellular phone; and to dispense said user with a functioning cellular telephone.

The present invention also provides an automatic mobile communicator depot system and methodology. There is thus provided in accordance with a preferred embodiment of the present invention an automatic mobile communicator depot system including a mobile communicator acceptor for accepting mobile communicators and providing mobile communicator acceptance inputs, a mobile communicator dispenser for dispensing substitute mobile communicators in response to substitute mobile communicator dispensing instructions, a customer interface receiving customer inputs identifying a specific mobile communicator with a specific customer, and a depot controller responsive at least to the customer inputs and the acceptance inputs and including dispenser control functionality for providing dispensing instructions to the mobile communicator dispenser to dispense a specific substitute mobile communicator to a specific customer and automatic telephone number transfer functionality for transferring a telephone number from a mobile communicator received by the mobile communicator acceptor from a given customer to the substitute mobile communicator dispensed by the mobile communicator dispenser to the customer.

It should be pointed out that the telephone number of the substitute mobile communicator dispensed by said mobile communicator dispenser to said customer may be identical to the telephone number of the mobile communicator received by said mobile communicator acceptor or may be different.

Reference is now made to FIGS. 1A, 1B and 1C, which are simplified illustrations of three examples of an initial stage of mobile communicator depot methodology in accordance with a preferred embodiment of the present invention. Turning to FIG. 1A, there is shown a scenario wherein a customer, whose mobile communicator 100, here a smartphone, is broken, initiates a repair over the internet such as by using his home computer to access the customer service website of cellular telephone service provider.

Typically the customer identifies himself to the customer service website by entering his mobile communicator telephone number and a unique identifier, such as the last four digits of his credit card. The customer may then select the Automated Telephone Repair Service and is then prompted to describe the problem with his mobile communicator 100, such as a broken screen. It is appreciated that once the customer enters the telephone number of mobile communicator 100, the system already has information regarding the identity, type and functionality of mobile communicator 100.

The customer is preferably directed to the nearest repair depot 102 and may be shown its location on a map.

Upon arrival at the repair depot 102, the customer is prompted to identify himself and his mobile communicator 100 by entering his mobile communicator telephone number and a unique identifier, such as the last four digits of his credit card.

Turning to FIG. 1B, there is shown an alternative scenario wherein a customer, whose mobile communicator 100, here a smartphone, is broken, initiates a repair over the internet such as by using another mobile communicator 103, such as an iPAD to access the customer service website of cellular telephone service provider.

Typically the customer identifies himself by entering his mobile communicator telephone number and a unique identifier, such as the last four digits of his credit card. The customer may then select the Automated Telephone Repair Service and is then prompted to describe the problem with his mobile communicator 100, such as a broken screen. It is appreciated that once the customer enters the telephone number of mobile communicator 100, the system already has information regarding the identity, type and functionality of mobile communicator 100.

The customer is preferably directed to the nearest repair depot 102 and may be shown its location on a map.

Upon arrival at the repair depot 102, the customer is prompted to identify himself and his mobile communicator by entering his mobile communicator telephone number and a unique identifier, such as the last four digits of his credit card.

Turning to FIG. 1C, there is shown a scenario wherein a customer, whose mobile communicator 100, here a smartphone, is broken, is unable to initiate a repair over the internet, since he does not have access to the internet. In such a case, the customer may go directly to a repair depot 102.

Typically the repair depot 102 interacts directly with the customer and prompts the customer to identify himself by entering his mobile communicator telephone number and a unique identifier, such as the last four digits of his credit card. The customer is then prompted to describe the problem with his mobile communicator, such as a broken screen. It is appreciated that once the customer enters the telephone number of mobile communicator 100, the system already has information regarding the identity, type and functionality of mobile communicator 100.

Reference is now made to FIGS. 2A, 2B and 2C, which together are a simplified illustration of an automatic acceptance processing of a customer's mobile communicator stage of mobile communicator depot methodology in accordance with a preferred embodiment of the present invention. As seen in FIG. 2A, upon arrival at depot 102, a customer is prompted to place his mobile communicator 100 in a receiving receptacle 104.

As shown in FIG. 2B, depot 102 preferably includes functionality for confirming that mobile communicator 100 is placed in the receptacle 104 with its screen 106 facing upwards and also includes a camera 108 for photographing the top surface of mobile communicator 100, the top surface including screen 106.

A robotic mechanism 110 is preferably employed for initially repositioning the receptacle 104 containing mobile communicator 100 from its initial position, shown in FIG. 2A, at which the customer placed mobile communicator 100 therein, to a second position, shown in FIG. 2B at which the top surface of mobile communicator 100 is photographed by camera 108, to a third position in which mobile communicator is disposed within one of a multiplicity of bins 112, each of which is preferably identified by a barcode 114 and which are located in a storage and transport structure 116.

A barcode scanner 118 is preferably mounted on robotic mechanism 110 for reading barcode 114 of bin 112 in which the customer's mobile communicator 100 is placed, for recording the identity of bin 112 and for associating it with the identity of customer's mobile communicator 100 in a computerized database.

As shown in FIG. 2C, a virtual repair ticket 120 is preferably generated. Virtual repair ticket 120 preferably includes the customer's mobile communicator telephone number, the bin number of the bin in which mobile communicator 100 is disposed, and a description of the required repair as provided by the customer. The virtual repair ticket 120 is preferably transmitted via the internet to a central server 122, typically located at a site remote from depot 102, which site may house a repair center.

The customer receives an acknowledgement of receipt of the deposited mobile communicator 102, preferably in the form of an audio-visual message which is backed up by a virtual email message and preferably is prompted to select a preferred pick up location, which need not be the same depot 102. Upon receipt of a user pick up location selection input, the depot 102 preferably provides an acknowledgement, preferably in the form of an audio-visual message which is backed up by a virtual email message.

Reference is now made to FIGS. 3A, 3B, 3C, 3D, 3E, 3F and 3G, which together are a simplified illustration of a replacement mobile communicator personalization and dispensing stage of mobile communicator depot methodology in accordance with a preferred embodiment of the present invention. As shown in FIGS. 3A-3G, it is a particular feature of the present invention that, upon request by the customer, a replacement mobile communicator is automatically provided to the customer by the depot.

As shown in particular in FIG. 3A, depot 102 offers the customer a replacement mobile communicator to be used while his broken mobile communicator is being repaired. As further shown in FIG. 3B, upon accepting the offer, the customer is then asked by depot 102 whether he would prefer that his contact list be transferred to the replacement mobile communicator.

Thereafter, as shown in FIG. 3C, depot 102 selects a replacement communicator bin 130 which is located in a replacement communicator storage and transport structure 132 and which contains a replacement mobile communicator, and preferably employs barcode scanner 118 which is preferably mounted on robotic mechanism 110 to read the barcode 136 of bin 130.

As further shown in FIG. 3C, a virtual mobile communicator activation instruction 140 is preferably generated by depot 102, which instruction 140 preferably includes the customer's mobile communicator telephone number and the bin number of bin 130 retrieved from barcode 136. Instruction 140 is preferably transmitted via the internet to a central server 122, typically located at a site remote from depot 102, which site may house a service center. It is appreciated that server 122 stores information for associating bin numbers of bins in replacement communicator storage and transport structure 132 with identifiers of mobile communicators stored therewithin. Therefore, server 122 may utilize the information in instruction 140 to associate the customer's mobile communicator telephone number with the identifier of the replacement mobile communicator located in bin 130, and to store this information for ascertaining, upon return of repaired mobile communicator 100 to the customer, that the replacement mobile communicator dispensed to the customer is indeed returned.

Responsive to instruction 140, server 122 preferably activates the replacement mobile communicator located in bin 130 in association with the customer's mobile communicator telephone number.

As yet further shown in FIG. 3C, depot 102 then generates a virtual contact list synchronization instruction 150, which instruction 150 preferably includes the customer's/mobile communicator's identifier and the bin number of bin 130 retrieved from barcode 136. Instruction 150 is preferably transmitted via the internet to central server 122 and instructs server 122 to download the customer's contact list to depot 102. It is appreciated that contact lists stored on mobile communicators are typically also stored on the internet on various backup facilities, such as, for example, on a central backup server of the cellular telephone service provider, and therefore may be accessible to server 122.

As yet further shown in FIG. 3C, upon receiving virtual contact list synchronization instruction 150, server 122 preferably transmits the customer's contact list 160 to depot 102 where it is temporarily stored.

Turning now to FIG. 3D, it is shown that robotic mechanism 110 is preferably employed for retrieving replacement mobile communicator 162 from bin 130. Preferably, after replacement mobile communicator 162 is retrieved, depot 102 loads contact list 160 onto mobile communicator 162 preferably by wirelessly communicating therewith. It is appreciated that communication between depot 102 and replacement mobile communicator 162 may alternatively be wired.

Figure 3E:
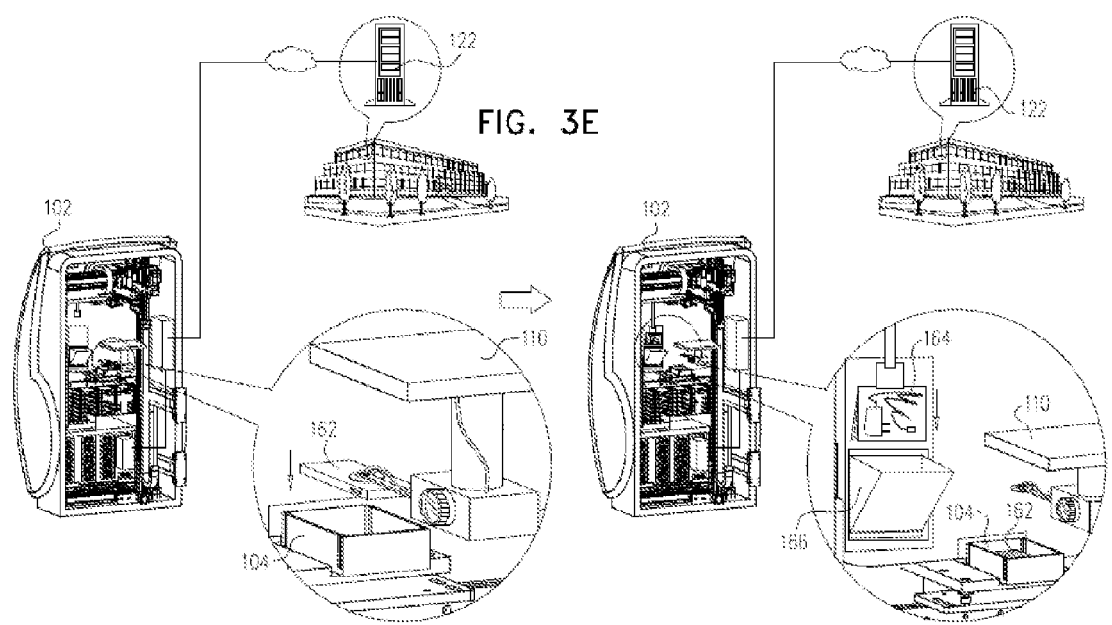

Thereafter, as shown in FIG. 3E, robotic mechanism 110 preferably places replacement mobile communicator 162 into receptacle 104, and also preferably places a compatible mobile communicator accessory kit 164 into a dispenser bin 166. It is appreciated that mobile communicator accessory kit 164 may include, for example, a mobile communicator charger and data synchronizing cables.

Turning now to FIG. 3F, is shown that depot 102 thereafter notifies the customer that a replacement mobile communicator having his contact list loaded thereupon has been prepared for him, and prompts the customer to remove replacement mobile communicator 162 and mobile communicator accessory kit 164 from receptacle 104 and bin 166, respectively. As further shown in FIG. 3G, after retrieving replacement mobile communicator 162 and mobile communicator accessory kit 164, the customer ascertains that replacement mobile communicator 162 is loaded with his contact list, and that replacement mobile communicator 162 is fully functional.

Figure 4A:
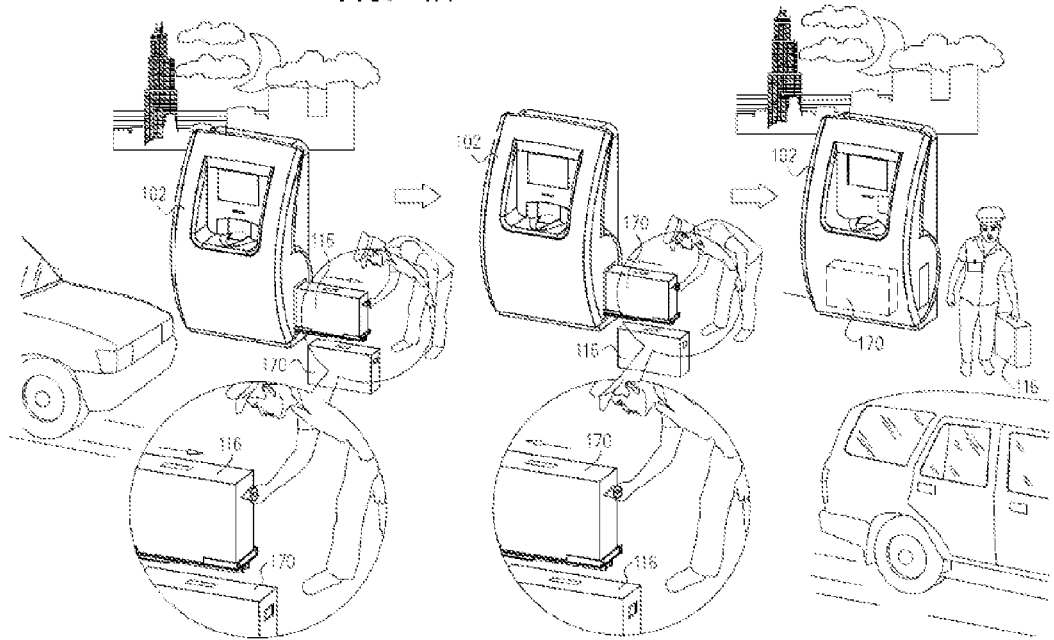

Reference is now made to FIGS. 4A, 4B, 4C, 4D, 4E and 4F, which together are a simplified illustration of a back-end processing stage of mobile communicator depot methodology in accordance with a preferred embodiment of the present invention. As shown in FIG. 4A, a mobile communicator depot service employee arrives at depot 102 and removes storage and transport structure 116 from depot 102. As described hereinabove with regard to FIG. 2A, storage and transport structure 116 preferably comprises bins 112, each of bins 112 preferably containing a mobile communicator destined for repair.

As further shown in FIG. 4A, after removing storage and transport structure 116 from depot 102, the depot service employee inserts an alternative storage and transport structure 170 into depot 102, transport structure 170 preferably having repaired mobile communicators disposed in bins therewithin. The method by which mobile communicators are repaired and disposed within transport structure 170 will be described in greater detail hereinbelow with regard to FIGS. 4B-4E.

As yet further shown in FIG. 4A, after inserting alternative storage and transport structure 170 into depot 102, the depot service employee removes storage and transport structure 116 from the premises and, as shown in FIG. 4B, delivers storage and transport structure 116 to a mobile communicator service center.

Turning now to FIG. 4B, it is shown that a mobile communicator service center employee receives storage and transport structure 116 from the depot service employee and preferably scans the barcode of each of bins 112 which contains a broken mobile communicator into a computer 172. It is appreciated that computer 172 preferably communicates with server 122 and is operative to retrieve information associated with broken mobile communicator 100 which was submitted to server 122 via a virtual repair ticket, such as virtual repair ticket 120 of FIG. 2C. As described hereinabove with regard to FIG. 2C, this information may include, for example, a bin identification number of the bin 112 containing broken mobile communicator 100, a mobile communicator customer identifier such as a telephone number, and a description of the required repair. The information also preferably includes an identifier of the particular depot at which mobile communicator was deposited and an identifier of the preferred pickup location of the repaired mobile communicator as, for example, specified by the customer in the illustration of FIG. 2C.

As yet further shown in FIG. 4B, after retrieving the information of virtual repair ticket 120 from computer 172, the service center employee retrieves mobile communicator 100 from its bin 112 and repairs mobile communicator 100.

Figure 4C:
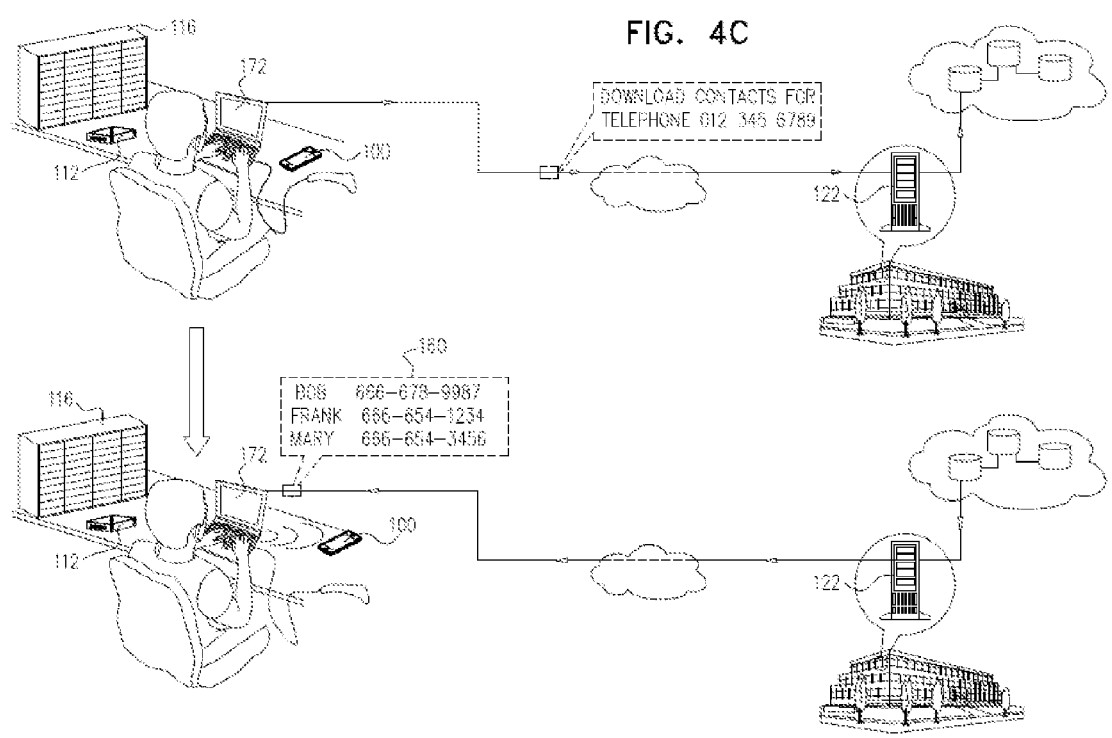

It is appreciated that while being repaired, the contact list stored in mobile communicator 100 may be partially or completely deleted. The contact list may have also been partially or completely deleted upon breakage of mobile communicator 100. Therefore, as shown in FIG. 4C, the service center employee preferably utilizes computer 172 to access server 122 to download the customer's contact list 160 to computer 172 in preparation for reactivation of mobile communicator 100. As described hereinabove with regard to the illustration of FIG. 3C, it is appreciated that mobile communicator contact lists are typically also stored on the internet on various backup facilities, such as, for example, on a central backup server of the cellular telephone service provider, and therefore may be accessible to server 122.

As further shown in FIG. 4C, the service center employee preferably loads contact list 160 onto mobile communicator 100 by wirelessly transmitting contact list 160 from computer 172 to mobile communicator 100. Alternatively, transmission of the contact list from computer 172 to mobile communicator 100 may be wired.

Turning now to FIG. 4D, it is shown that after completing the repair of mobile communicator 100 and loading contact list 160 onto repaired mobile communicator 100, the service center employee then preferably utilizes computer 172 to generate a virtual delivery ticket 176 for repaired mobile communicator 100, which ticket 176 preferably includes a physical identifier of communicator 100, such as an IMEI identifier. It is appreciated that the physical identifier may be retrieved from communicator 100, for example, by scanning a barcode embedded in communicator 100 or by manually querying communicator 100 via its user interface.

Preferably, the service center employee also scans a barcode identifier 178 of bin 174 into computer 172 and adds identifier 178 to ticket 176. The service center employee then preferably utilizes computer 172 to communicate with server 122, where the identifier of communicator 100 as provided in ticket 176 is used to identify communicator 100 as that of the customer of FIGS. 1A-3G. Server 122 is also preferably operative to associate the customer's identifier, such as his telephone number, and the preferred pickup location as originally specified by the customer, with ticket 176.

It is appreciated that server 122 is also preferably operative to provide the service center employee with an identifier of a storage and transport structure 180 which is destined for delivery to the customer's preferred pickup location. Upon verifying that the details of ticket 176 are correct, the service center employee preferably submits the completed ticket 176 to server 122. As shown in FIG. 4E, the service center employee then places repaired mobile communicator into bin 174 and inserts bin 174 into storage and transport structure 180 which is destined for delivery to the customer's preferred pickup location.

As further shown in FIG. 4E, server 122 then preferably sends a message 181 to the customer, notifying the customer that his mobile communicator has been repaired and will be available at the pickup location he originally specified on the following day at or after a particular time, such as 10:00 AM. It is appreciated that message 181 may be, for example, an email message or an SMS message sent to the customer's replacement mobile communicator 162.

Turning now to FIG. 4F, it is shown that a communicator depot service employee arrives at the mobile communicator service center on the following day at 6:00 AM, and retrieves storage and transport structure 180 for transport to a mobile communicator depot 182 located at the customer's preferred pickup location.

As further shown in FIG. 4F, upon arriving at depot 182, the communicator depot service employee preferably removes a storage and transport structure 184 from within depot 182 for transport to mobile communicator service center. Thereafter, the communicator depot service employee inserts storage and transport structure 180 into depot 182, storage and transport structure 180 having repaired mobile communicators disposed therewithin. As yet further shown in FIG. 4F, upon insertion of storage and transport structure 180 into depot 182, depot 182 preferably sends a message to server 122, notifying server 122 that storage and transport structure 180 having repaired mobile communicators disposed therewithin has been inserted into depot 182.

Reference is now made to FIGS. 5A and 5B, which together are a simplified illustration of a replacement mobile communicator return stage of mobile communicator depot methodology in accordance with a preferred embodiment of the present invention. As shown in FIG. 5A, after storage and transport structure 180 containing repaired mobile communicator 100 has been deposited in depot 182, such as at 8:00 AM, the customer preferably receives a message from server 122 that his repaired mobile communicator 100 is now available at his preferred pickup location. It is appreciated that the message may be, for example, an email message or an SMS message sent to the customer's replacement mobile communicator 162.

Thereafter, such as at 10:00 AM, the customer arrives at depot 182 and identifies himself to depot 182 by entering his mobile communicator telephone number and a unique identifier, such as the last four digits of his credit card. The customer is then prompted to select a service option, and proceeds to select the Retrieve Repaired Telephone service.

Thereafter, as shown in FIG. 5B, the customer is prompted by depot 182 to return replacement mobile communicator 162 and accessory kit 164. The customer then preferably proceeds to place replacement mobile communicator 162 into receiving receptacle 104 and accessory kit 164 into bin 166. Depot 182 then preferably notifies the customer that the returned equipment is being processed.

Reference is now made to FIGS. 6A, 6B, 6C and 6D, which together are a simplified illustration of replacement mobile communicator acceptance, validation and depersonalization functionality and customer's mobile communicator repersonalization and dispensing functionality in accordance with a preferred embodiment of the present invention.

As shown in FIG. 6A, depot 182 preferably includes functionality for confirming that replacement mobile communicator 162 is placed in receptacle 104 with its screen 106 facing upwards, and also includes a camera 108 for photographing the top surface of mobile communicator 162. It is appreciated that photographing of replacement mobile communicator 162 by camera 108 is operative to ascertain that mobile communicator 162 is not significantly damaged.

Robotic mechanism 110 is preferably employed for initially repositioning the receptacle 104 containing replacement mobile communicator 162 from its initial position, shown in FIG. 5B, at which the customer placed replacement mobile communicator 162 therein, to a second position, shown in FIG. 6A at which the top surface of replacement mobile communicator 162 is photographed by camera 108. Preferably, the replacement mobile communicator 162 is verified by depot 182 to be identical to the replacement mobile communicator originally dispensed to the customer in the illustrations of FIGS. 3A-3G, for example by scanning the IMEI identifier of replacement mobile communicator 162 and comparing the scanned IMEI identifier to the IMEI identifier of the replacement mobile communicator originally dispensed to the customer, as stored on server 122.

Robotic mechanism 110 then preferably removes replacement mobile communicator 162 from receptacle 104 and disposes replacement mobile communicator 162 into one of bins 186 located in a replacement communicator storage and transport structure 188. Each of bins 186 is preferably identified by a barcode 190. Barcode scanner 118 which is preferably mounted on robotic mechanism 110 is preferably employed for reading the barcode of bin 186 in which replacement mobile communicator 162 is disposed, for recording the identity of the bin 186 and for associating the identity of bin 186 with the identifier of replacement mobile communicator 162 in a computerized database.

Thereafter, as shown in FIG. 6B, accessory kit 164 is preferably retrieved from bin 166 by a second robotic arm 190. Upon completing the retrieval of replacement mobile communicator 162 and accessory kit 164 from receptacle 104 and bin 166, depot 182 preferably communicates with server 122 and requests deactivation of replacement mobile communicator 162 and reactivation of mobile communicator 100 in association with the customer's mobile communicator telephone number. It is appreciated that, as described hereinabove with reference to FIG. 4D, the customer's mobile communicator telephone number is associated by server 122 with mobile communicator 100 and is therefore sufficient to uniquely identify mobile communicator 100.

As yet further shown in FIG. 6B, responsive to the communication from depot 182, server 122 deactivates replacement mobile communicator 162 and activates mobile communicator 100 in association with the customer's mobile communicator telephone number. Preferably, server 122 also provides the identifier of the specific bin 174 in storage and transport structure 180 which contains repaired mobile communicator 100. It is appreciated that upon deactivation of replacement mobile communicator 162, depot 182 may ascertain whether the customer has stored new data on replacement mobile communicator 162 during the period of time in which he was in possession of replacement mobile communicator 162, and may transfer the new data to mobile communicator 100 upon activation of mobile communicator 100.

Thereafter, as shown in FIG. 6C, barcode scanner 118, which is preferably mounted on robotic mechanism 110, is employed to identify and locate bin 174 by its barcode identifier 178, which identifier 178 was provided by server 122 to 182 as identifying the bin in which repaired mobile communicator 100 is disposed.

Upon locating bin 174, robotic mechanism 110 is preferably employed to retrieve repaired mobile communicator 100 from bin 174 and to deposit repaired mobile communicator 100 into receptacle 104, and to thereafter reposition receptacle 104 to a position which is accessible to the customer. As further shown in FIG. 6C, the customer is then prompted by depot 182 to retrieve his repaired mobile communicator from receptacle 104.

Figure 6D:
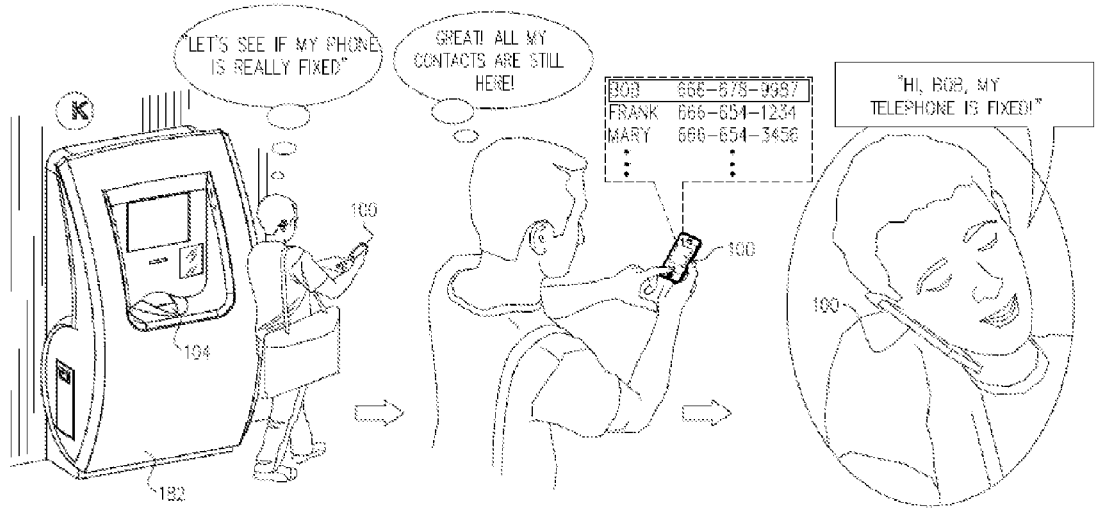

Turning now to FIG. 6D, it is shown that upon retrieving his repaired mobile communicator 100 from receptacle 104, the customer verifies that mobile communicator 100 is in working condition and that his contact list is present on communicator 100.

Figure 7A:
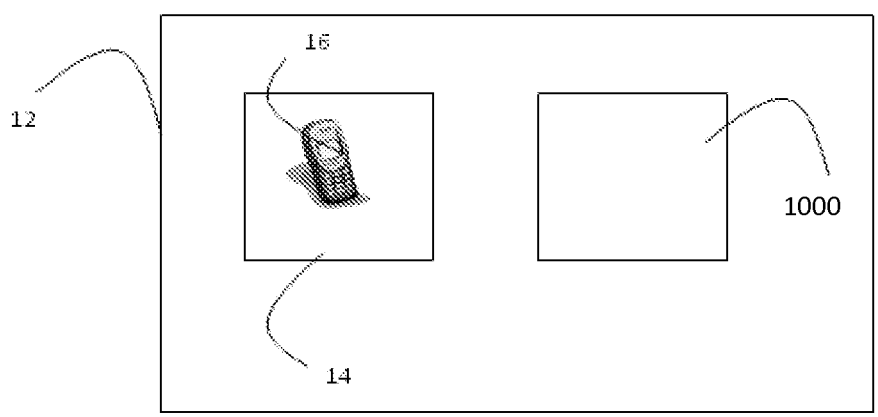
FIGS. 7a and b show features of a cellular phone console, in accordance with one embodiment of the present invention.

Reference is now made to FIG. 7a, which illustrates a preferred embodiment of the present invention, in which the system comprising a housing 12, a receiving port 14 for receiving a malfunctioning cellular mobile phone 16 and a dispensing mechanism 1000 for providing said user with a functioning cellular telephone.

It should be emphasized that the functioning cellular telephone does not necessarily have to be the same as the malfunctioning cellular mobile phone 16 (either the actual same phone or the same type) received.

It should be emphasized that according to another embodiment of the present invention the cellular phone console will be able to operate in a minimal interaction time between the client and the system in order to prevent any queues from creation and to maximize the convenient of use in the cellular phone console.

It should be emphasized that according to another embodiment of the present invention the cellular phone console will be adapted to be placed in public domains; but, will be with the ability to prevent any burglary and theft of the content of the cellular phone console (i.e., the malfunctioned cellular phones received).

It should be emphasized that according to another embodiment of the present invention the cellular phone console will have an identification mechanism adapted to identify the user/client.

The identification mechanism can be based on identifying the client's phone number and the identification that the client himself is indeed who he claims to be.

It should be emphasized that according to another embodiment of the present invention the cellular phone console will have an identification mechanism that will identify the malfunctioned cellular phone received (i.e., the model of the same, the producer of the same, the phone number of the client, the I.D. number of the client, address, email et cetera).

It should be emphasized that according to another embodiment of the present invention the cellular phone console will present the client with a menu in which the client will elect the malfunction of the phone.

According to another embodiment, the client would be able to add any comment/complaint with respect to the service or the malfunctioned phone.

According to another embodiment, the client would be able to receive an alternative functioning phone.

According to another embodiment, the cellular phone console will be provided with the ability to detect errors (e.g., in the client's message).

According to another embodiment, once the malfunctioned phone has been received within the cellular phone console, the client will receive a detailed document informing him on at least one detail selected from (a) the malfunctioned phone received; i.e., the identification of the phone's type, the number of the same etc. (b) the malfunction itself; (c) the time which the functioning phone will be provided; (d) the client's detail. i.e., name, ID number, a second number at which he can be reached, home address etc.; and, (e) an identification number in case something is lost; (e) the cellular phone console's identification number, its exact position, etc; (f) detail on the date and time at which the malfunctioned phone has been deposited in said cellular phone console; an approximation as for the time that will be needed for the repair of said malfunctioned phone; and any combination thereof.

Thus, according to this embodiment, the client, once depositing a malfunctioned phone, will receive a receipt. The receipt will include details of the malfunctioned phone (type, number etc.), the client (name, address, reachable number etc.), the malfunction itself (either software malfunctions or hardware malfunctions, etc.), details on the cellular phone console in which the malfunctioned phone had been deposit, detail on the date and time at which the malfunctioned phone has been deposited in said cellular phone console, and an identification number in case something is lost; and any combination thereof.

According to another embodiment, the malfunctioned phone, once deposited, is sent to the manufacturer and/or agent for repair. Once the malfunctioned phone has been repaired, the same can be sent to either (a) directly to the client; (b) to the cellular phone console in which the malfunctioned phone was deposited; or (c) another cellular phone console.

According to another embodiment, the client, when receiving the repaired phone, will be given by the cellular phone console a detailed second receipt in which there will be details of the malfunction, and the repair (i.e., whatever was repair in the malfunctioned phone, e.g. broken external panel).

According to another embodiment of the present invention, the repaired phone can be received from the cellular phone console at which said malfunctioned phone was deposit or a different cellular phone console.

According to another embodiment, once the malfunctioned phone has been received, the same will be enclosed within a protected container. Said container will be protected against theft.

According to another embodiment, the client would be able to back-up the information obtained within the malfunctioned phone.

According to another embodiment, the client would be able to diagnose his malfunctioned phone.

According to another embodiment, all of the malfunctioned phone's accessories (e.g., bag, battery, charger etc.) will be tagged with radio frequency identification (RFID).

According to another embodiment, once the malfunctioned phone is repaired, an SMS message will be sent to the client informing him of the same.

It should be emphasized that according to another embodiment of the present invention the cellular phone console will be provided with a camera adapted to identify the client.

Figure 7B:
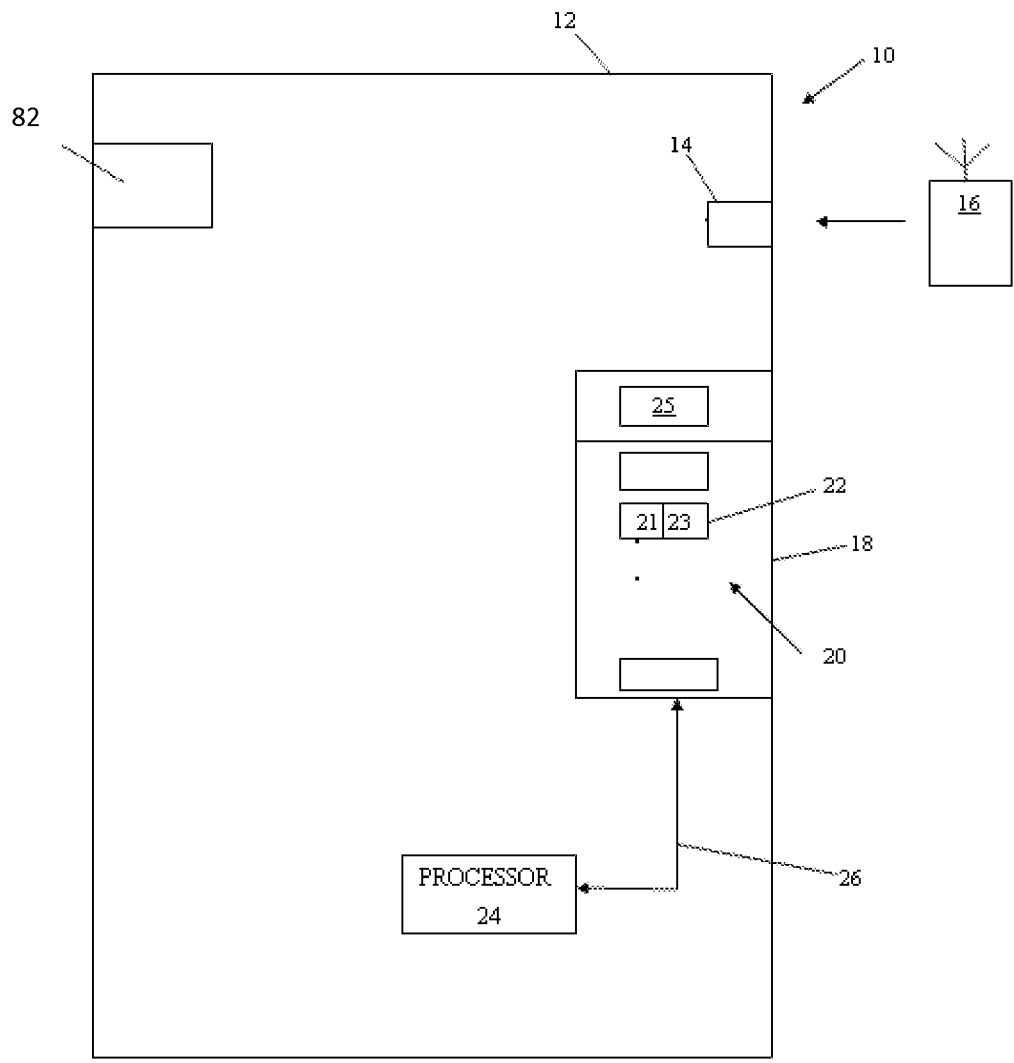

Reference is now made to FIG. 7b, which shows a cellular phone console 10, in accordance with one embodiment of the present invention. The cellular phone console 10 includes, inter alia, a housing 12, a receiving port 14 for receiving a malfunctioning cellular mobile phone 16 as well as a user interactive unit 18 for displaying the current status and the current functionalities of the console 10, including a menu of cellular mobile phone malfunctions 20.

According to one embodiment, the user complaining of the malfunctioning mobile phone 16 inserts the malfunctioning mobile phone 16 into the receiving port 14 and the user interactive unit 18 displays, inter alia, a menu of mobile phone malfunctions 20, which include hardware malfunctions 21 and software malfunctions 23, as described below.

The user selects at least one malfunction 22 from the menu of mobile phone malfunctions 20, typically, by touching an appropriate menu display malfunctions 25, as displayed by the user interactive unit 18.

It is appreciated that the user is also able to select at least one hardware malfunction, at least one software malfunction and/or a combination of hardware and software malfunctions.

The console 10 also includes a processor 24, which controls the operational procedures and processes in the console 10.

Figure 8:
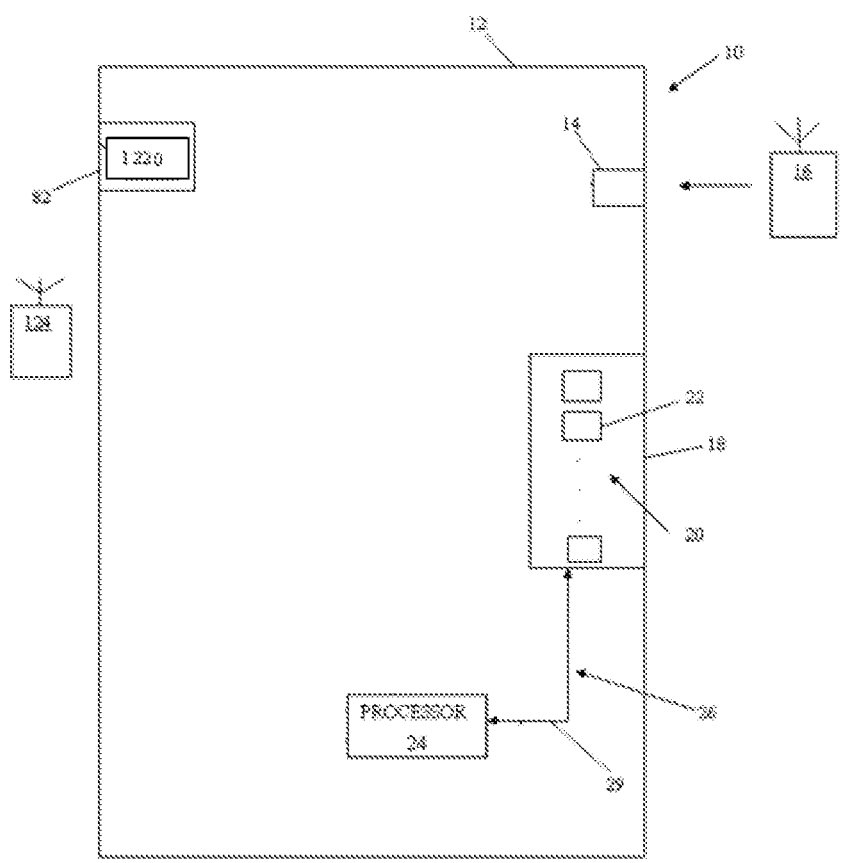
FIG. 8 shows further features of the console, in accordance with one embodiment of the present invention.

Reference is now made to FIGS. 7b-8, which shows further features of the console 10, in accordance with a preferred embodiment of the present invention.

The console 10 may also include a replacement mobile phone storage compartment 1220 coupled to an ejection port 82. Thus, following the insertion of the malfunctioning mobile phone 16 in the receiving port 14, the user interactive unit 18 displays on the display panel 1060 (see FIG. 9) a list of temporary replacement cellular mobile phones 124, for selection by the user.

The malfunctioning mobile phone 16 is now prepared for forwarding to the mobile manufacturer and/or agent for repair.

Figure 9:
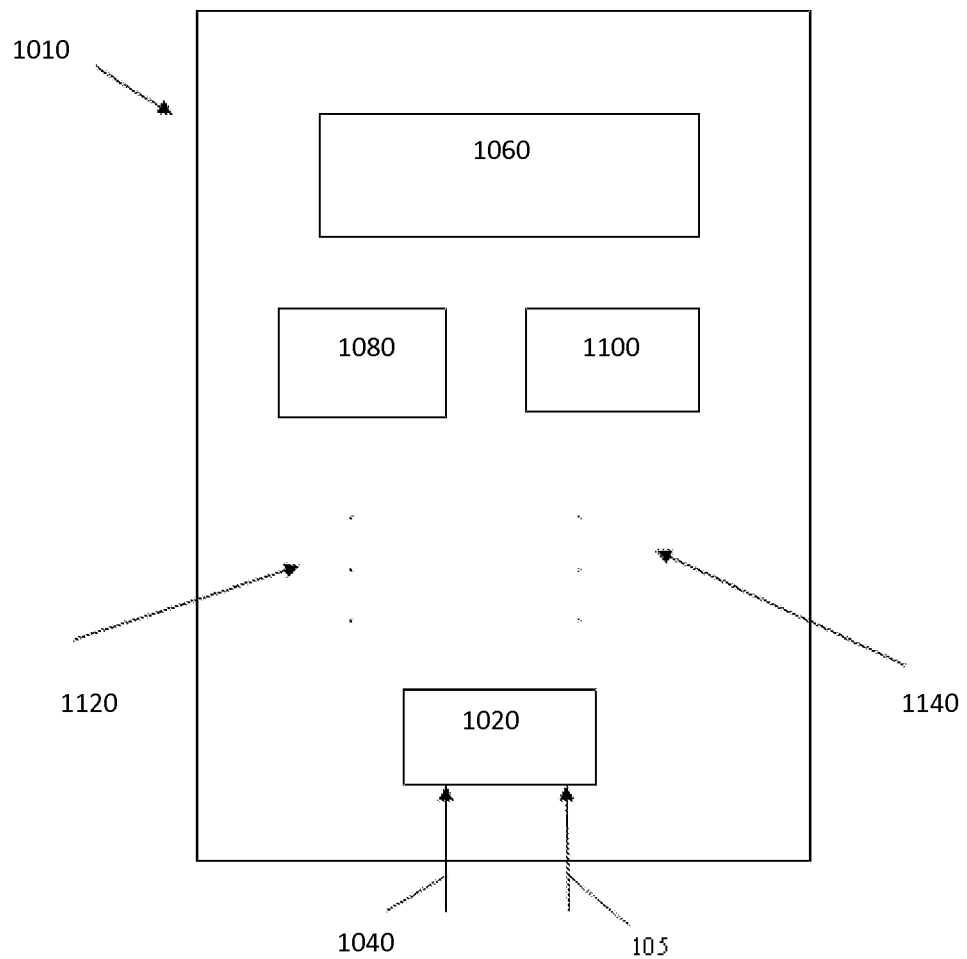
FIG. 9 shows a front panel of the user interactive unit, in accordance with one embodiment of the present invention.

If the user wishes to select a replacement mobile phone 124, the user selects this option by activating the appropriate option on the interactive unit 18 and appropriately responds to a relevant prompt displayed on a display unit 1060 (see FIG. 9).

During the period of time in which the malfunctioning mobile phone 16 is being repaired by forwarding the malfunctioning mobile phone 16 the phone manufacturer and/or agent for repairs, a replacement mobile phone 124 is available to the user and obtained via the ejection port 82 of the console 10.

In order to obtain the replacement phone 124, the console 10 provides the user with an appropriate repair certificate that the malfunctioning phone 16 is being forwarded to the mobile phone manufacturer and/or agent for repair.

Otherwise, the user receives the repair certificate without the replacement mobile phone 124.

According to another embodiment of the present invention, the console 10 provides the user with an appropriate repair certificate that the malfunctioning phone 16 is being forwarded to the mobile phone manufacturer and/or agent for repair.

The repair certificate 500 (not shown in the figures) is being issued by a repair certificate mechanism (e.g., printer) 501 (see FIGS. 10-11), once an issuing signal 502 (not shown in the figures) is being sent from the processor 24.

The repair certificate can comprise at least one detail selected from (a) the malfunctioned phone received; i.e., the identification of the phone's type, the number of the same etc. (b) the malfunction itself; (c) the time which the functioning phone is expected to be provided; (d) the client's detail. i.e., name, I.D. number, a second number at which he can be reached, home address etc.; and, (e) an identification number in case something is lost; (f) the cellular phone consoles identification number, its exact position, etc.; (g) detail on the date and time at which the malfunctioned phone has been deposited in said cellular phone console, approximate time in which the malfunctioned phone will be repaired; and any combination thereof.

According to another embodiment, the malfunctioned phone, once deposited, is sent to the manufacturer and/or agent for repair. Once the malfunctioned phone has been repaired, the same can be sent to either (a) directly to the client; (b) to the cellular phone console in which the malfunctioned phone was deposited; or (c) another cellular phone console.

According to another embodiment, the client, when receiving the repaired phone, will be given by the cellular phone console a detailed second receipt in which there will be details of the malfunction, and the repair (i.e., whatever was repair in the malfunctioned phone, e.g. broken external panel).

According to another embodiment of the present invention, the repaired phone can be received from the cellular phone console at which said malfunctioned phone was deposit or a different cellular phone console.

Reference is now made to FIG. 9, which shows a front panel 1010 of the user interactive unit 18, in accordance with one embodiment of the present invention.

The front panel 1010 includes, inter alia, a data input unit 1020, such as a touch-type unit, for the user to input requisite data 1040, such cellular mobile phone type and model number and a display screen 1060, such as an LCD screen, for displaying various data, such as the user inputted data 104 as well as selected malfunction data as well as informing the user of the status and progress of a repair procedure.

The front panel 1010 includes, inter alia, a data input unit 1020, such as a touch-type unit, for the user to input data 1040 and also a user identification code 105.

The front panel 1010 is typically divided into a hardware section 1080 and a software section 1100. The sections 1080 and 1100 include various options 1120 and 1140, respectively, available for the user to identify and define to the console 10, the mobile phone malfunction and/or malfunctions. Typically, the malfunctions include the hardware malfunctions 21 and the software malfunctions 23 listed above.

It should be emphasized, however, that in accordance with another embodiment of the present invention, console 10 doesn't necessarily includes a data input unit 1020, hardware section 1080 and the software section 1100.

If the user detects that a mobile phone malfunction is not included in the options 1120 and/or 1140, the console 10 includes an option for the user to input a non-listed malfunction 1200 (not shown in the figures) by the user inputting the non-listed malfunction into the console 10 by means of the input unit 1020.

Figure 10:
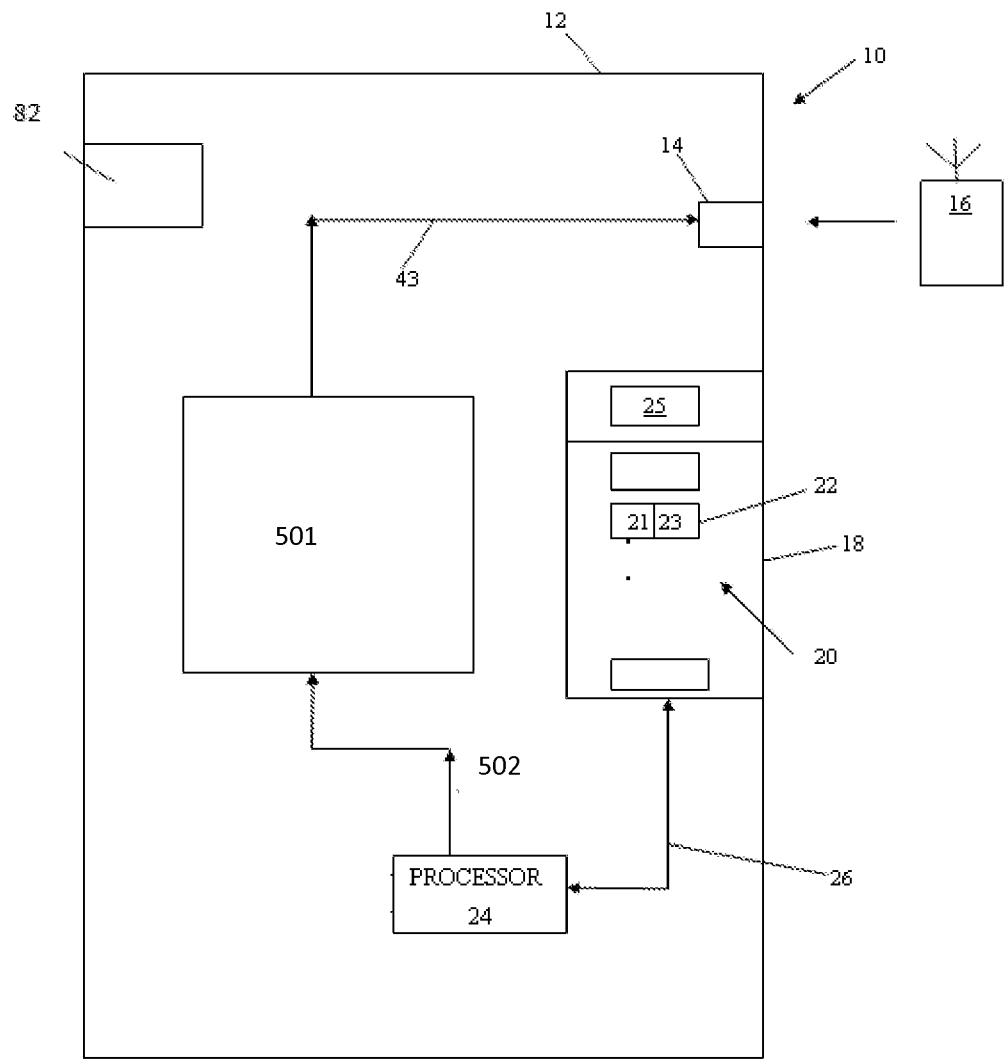
FIGS. 10-11 illustrate another embodiment of the present invention in which a repair certificate mechanism (e.g., printer) is illustrated.
Figure 11:
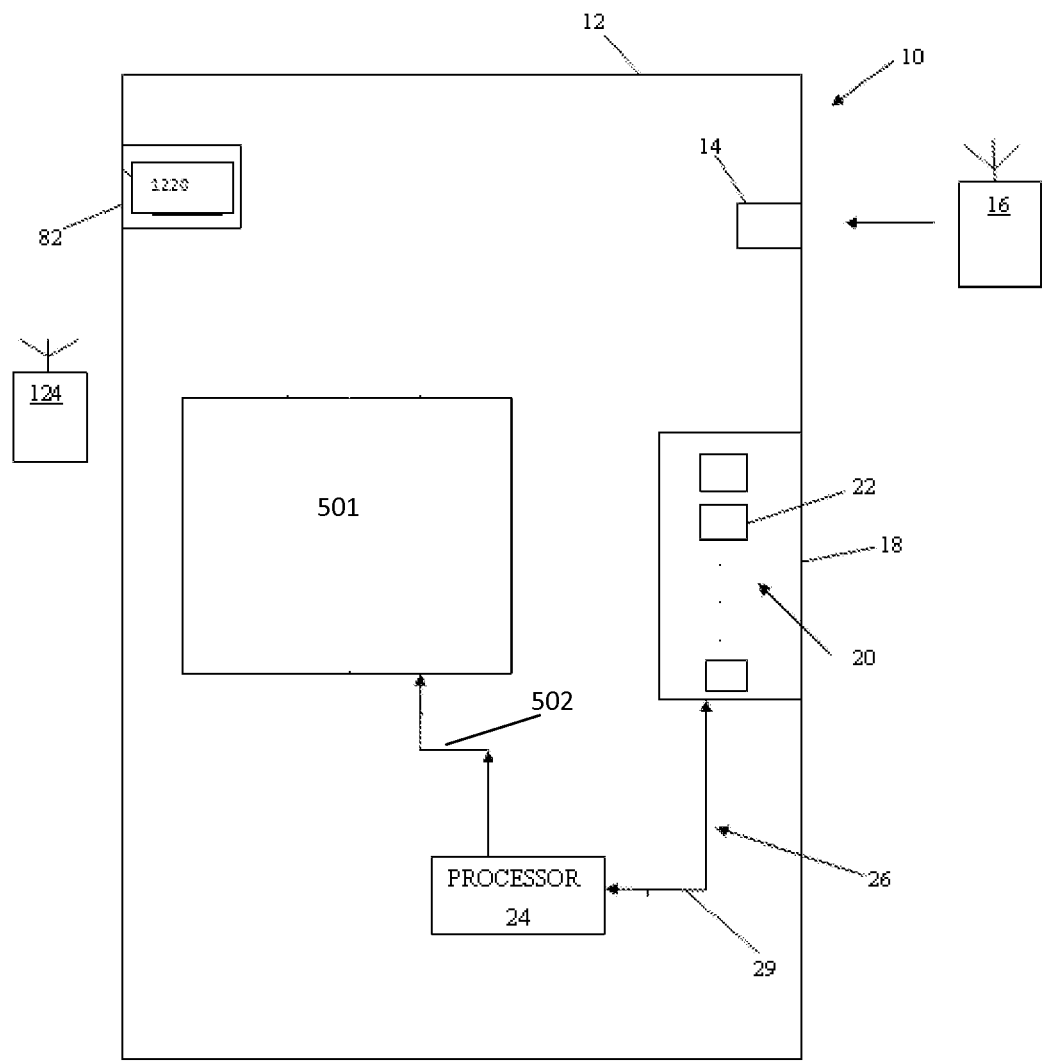

Reference is now made to FIGS. 10-11 illustrating a preferred embodiment of the present invention in which a repair certificate mechanism (e.g., printer) 501 is illustrated.

Reference is now made to FIG. 10, which shows a cellular phone console 10, in accordance with one embodiment of the present invention. The cellular phone console 10 includes, inter alia, a housing 12, a receiving port 14 for receiving a malfunctioning cellular mobile phone 16 as well as a user interactive unit 18 for displaying the current status and the current functionalities of the console 10.

A user complaining of the malfunctioning mobile phone 16 inserts the malfunctioning mobile phone 16 into the receiving port 14 and the user interactive unit 18 displays, inter alia, a menu of mobile phone malfunctions 20, which include hardware malfunctions 21 and software malfunctions 23, as described below.

It should be emphasized that the interactive unit 18 displays does not necessarily displays the malfunctions 20 and the user simply deposit the malfunctioning cellular mobile phone 16 in console 10.

Thus, alternatively, it should be pointed out that the user merely deposit the malfunctioning mobile phone 16 without selecting a malfunction from the menu of mobile phone malfunctions 20.

Alternatively, the user selects at least one malfunction 22 from the menu of mobile phone malfunctions 20, typically, by touching an appropriate menu display malfunctions 25, as displayed by the user interactive unit 18.

The malfunction 22 can be at least one hardware malfunctions 21 or at least one software malfunctions 23 or any combination thereof.

It is appreciated that the user is also able to select at least one hardware malfunction, at least one software malfunction and/or a combination of hardware and software malfunctions.

The console 10 also includes a processor 24, which controls the operational procedures and processes in the console 10.

According to this embodiment, the console 10 also include a replacement mobile phone storage compartment 1220 coupled to an ejection port 82.

Thus, following the insertion of the malfunctioning mobile phone 16 in the receiving port 14, the user interactive unit 18 displays on the display panel 1060 (see FIG. 9) a list of temporary replacement cellular mobile phones 124, for selection by the user.

The malfunctioning mobile phone 16 is now prepared for forwarding to the mobile manufacturer and/or agent for repair.

If the user wishes to select a replacement mobile phone 124, the user selects this option by activating the appropriate option on the interactive unit 18 and appropriately responds to a relevant prompt displayed on a display unit 1060.

During the period of time in which the malfunctioning mobile phone 16 is being repaired by forwarding the malfunctioning mobile phone 16 the phone manufacturer and/or agent for repairs, a replacement mobile phone 124 is available to the user and obtained via the ejection port 82 of the console 10.

In order to obtain the replacement phone 124, the console 10 provides the user with an appropriate repair certificate that the malfunctioning phone 16 is being forwarded to the mobile phone manufacturer and/or agent for repair. The repair certificate 500 is being issued by a repair certificate mechanism (e.g., printer) 501, once an issuing signal 502 is being sent from the processor 24.

The repair certificate will comprise details selected from (a) the malfunctioned phone received; i.e., the identification of the phone's type, the number of the same etc. (b) the malfunction itself; (c) the time which the functioning phone will be provided; (d) the client's detail. i.e., name, ID number, a second number at which he can be reached, home address etc.; and, (e) an identification number in case something is lost; (f) the cellular phone console's identification number, its exact position, etc. (g) detail on the date and time at which the malfunctioned phone has been deposited in said cellular phone console, and any combination thereof.

Otherwise, the user receives the repair certificate without the replacement mobile phone 124.

According to another embodiment, the malfunctioned phone, once deposited, is sent to the manufacturer and/or agent for repair. Once the malfunctioned phone has been repaired, the same can be sent to either (a) directly to the client; (b) to the cellular phone console in which the malfunctioned phone was deposited; or (c) another cellular phone console.

According to another embodiment, the client, when receiving the repaired phone, will be given by the cellular phone console a detailed second receipt in which there will be details of the malfunction, and the repair (i.e., whatever was repair in the malfunctioned phone, e.g. broken external panel).

According to another embodiment of the present invention, the repaired phone can be received from the cellular phone console at which said malfunctioned phone was deposit or a different cellular phone console.

According to another embodiment of the present invention, the malfunctioning cellular phone's number dispensed into the cellular phone console has the same phone number as the dispensed functioning cellular telephone.

According to another embodiment of the present invention, the cellular phone console will comprise means adapted to transfer data stored in the malfunctioning cellular phone to said functioning cellular telephone.

According to another embodiment of the present invention, the data comprises at least part of a contact list.

According to another embodiment of the present invention, the transfer of data is at least partly wireless.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. In a cellular phone station, a cellular phone console comprising:
   a receiving port for receiving, from a user, a malfunctioning cellular phone; and
   a dispensing mechanism for providing said user with a functioning cellular telephone.

2. The cellular phone console according to claim 1, wherein said cellular phone console also includes a user interactive unit comprising a user data input device for providing data input to said console, said input data comprising at least one of the following: a user identification code; cellular mobile phone manufacturer data; a cellular mobile phone serial number; a cellular mobile phone model type and any combination thereof.

3. The cellular phone console according to claim 1, further comprising an outlet port for ejecting a replacement cellular mobile phone.

4. The cellular phone console according to claim 1, further comprising a selection of temporary replacement cellular mobile phones.

5. The cellular phone console according to claim 4, further comprising an ejection port for providing said user with said selected temporary replacement cellular mobile phone.

6. The cellular phone console of claim 1, wherein said cellular phone console is provided with at least one anti-theft mechanism adapted to prevent theft of said malfunctioning cellular phones received.

7. The cellular phone console of claim 1, also comprising at least one identification mechanism adapted to identify said user.

8. The cellular phone console of claim 1, also comprising at least one identification mechanism adapted to identify said malfunctioning cellular phones received.

9. The cellular phone console of claim 8, wherein said at least one identification mechanism is adapted to identify at least one of a model of said malfunctioning cellular phones received, a producer of said malfunctioning cellular phones received, a phone number of said user, an I.D. number of said user, an address of said user, an email address of said user and any combination thereof.

10. The cellular phone console of claim 1, wherein said malfunctioning cellular phones received are enclosed within a protected container.

11. The cellular phone console of claim 1, also comprising a data interface adapted to back-up information contained within said malfunctioning cellular phones received.

12. The cellular phone console of claim 1, also comprising cell phone analysis functionality adapted to diagnose a malfunction of said malfunctioning phone.

13. The cellular phone console of claim 1, also comprising at least one camera adapted to identify said user.

14. The cellular phone console of claim 1, also comprising at least one printer adapted to dispense at least one receipt once said malfunctioning cellular phone is received within said cellular phone station.

15. A method for replacing a cellular mobile phone comprising:
   providing a cellular phone console, in a cellular phone station:
   inserting a malfunctioning cellular mobile phone into a receiving port of said station; and
   dispensing a functioning cellular telephone.

16. The method according to claim 15, additionally comprising inputting a user identification code into said console using a data input device.

17. The method according to claim 15, additionally comprising confirming that a user is a registered user.

18. The method of claim 17, additionally comprising dispensing at least one receipt once said malfunctioning cellular phone is received within said cellular phone station.

19. The method of claim 18, wherein said at least one receipt includes at least one of the following:
   details of said malfunctioning phone,
   details of a user of said malfunctioning phone,
   details of a malfunction of said malfunctioning phone,
   details of a cellular phone console in which said malfunctioning phone has been deposited,
   an identification number,
   a date and a time at which the malfunctioning phone is deposited in said cellular phone console, and
   any combination thereof.

20. The method of claim 19, wherein said details of said malfunctioning phone include at least one of a type of said malfunctioning phone, a phone number of said malfunctioning phone and any combination thereof.

* * * * *